US010936742B1

(12) United States Patent
Hampel et al.

(10) Patent No.: US 10,936,742 B1
(45) Date of Patent: *Mar. 2, 2021

(54) SYSTEMS AND METHODS FOR SECURING STORED COMPUTER FILES FROM MODIFICATION

(71) Applicant: CRU Acquisition Group, LLC, Vancouver, WA (US)

(72) Inventors: Larry Hampel, Huntsville, AL (US); Randal Barber, Portland, OR (US)

(73) Assignee: CRU DATA SECURITY GROUP, LLC, Vancouver, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/459,553

(22) Filed: Jul. 1, 2019

Related U.S. Application Data

(63) Continuation of application No. 14/799,524, filed on Jul. 14, 2015, now Pat. No. 10,339,328.
(Continued)

(51) Int. Cl.
*G06F 21/00* (2013.01)
*G06F 21/62* (2013.01)
(Continued)

(52) U.S. Cl.
CPC .......... *G06F 21/6218* (2013.01); *G06F 21/62* (2013.01); *G06F 21/6209* (2013.01);
(Continued)

(58) Field of Classification Search
None
See application file for complete search history.

(56) References Cited

U.S. PATENT DOCUMENTS

| 4,734,851 A | 3/1988 | Director |
| 4,811,293 A | 3/1989 | Knothe et al. |

(Continued)

FOREIGN PATENT DOCUMENTS

| CN | 201097285 Y | 8/2008 |
| JP | 57-172600 A | 10/1982 |

(Continued)

OTHER PUBLICATIONS

CRU DataPort, User Manual for TouchTech Q (Revised May 14, 2012), retrieved from the Internet at URL: www.CRU-DataPort.com, 12 pages.
(Continued)

*Primary Examiner* — Andrew J Steinle
(74) *Attorney, Agent, or Firm* — Kolisch Hartwell, P.C.

(57) ABSTRACT

A computer system for securing computer files from modification may include a processor; a first data storage area operatively coupled to the processor; a non-volatile second data storage area; and a control circuit. The second data storage area may be physically separate from the first data storage area. The second data storage area may store files that are executable by the processor, including executable files of an operating system configured to save temporary files on the at least a first data storage area. The control circuit may operatively couple the second data storage area to the processor, and may be operable in a first mode configured to block commands received from the processor and configured to modify the second data storage area from being communicated to the second data storage area. In a second mode, all commands may be allowed to the first and second data storage areas.

28 Claims, 10 Drawing Sheets

Related U.S. Application Data

(60) Provisional application No. 62/024,929, filed on Jul. 15, 2014.

(51) Int. Cl.
*G06F 21/72* (2013.01)
*G06F 21/78* (2013.01)
*G06F 21/74* (2013.01)

(52) U.S. Cl.
CPC .............. *G06F 21/72* (2013.01); *G06F 21/74* (2013.01); *G06F 21/78* (2013.01)

(56) References Cited

U.S. PATENT DOCUMENTS

| | | |
|---|---|---|
| RE33,328 E | 9/1990 | Director |
| 5,144,659 A | 9/1992 | Jones |
| 5,268,960 A | 12/1993 | Hung et al. |
| 5,280,398 A | 1/1994 | Wade et al. |
| 5,434,562 A | 7/1995 | Reardon |
| 5,559,993 A | 9/1996 | Elliott et al. |
| 5,586,301 A | 12/1996 | Fisherman et al. |
| 6,272,533 B1 | 8/2001 | Browne |
| 6,330,648 B1 | 12/2001 | Wambach et al. |
| 6,813,682 B2 | 11/2004 | Bress et al. |
| 6,823,419 B2 | 11/2004 | Berg et al. |
| 7,123,511 B2 | 10/2006 | Newell |
| 7,290,115 B2 | 10/2007 | Hill et al. |
| 7,318,137 B2 | 1/2008 | Bress et al. |
| 7,370,165 B2 | 5/2008 | Meharchand et al. |
| 7,478,207 B2 | 1/2009 | Nogami |
| 8,082,585 B1 | 12/2011 | Givonetti |
| 8,234,710 B2 | 7/2012 | Wenzinger et al. |
| 8,239,959 B2 | 8/2012 | Gellerich |
| 8,250,648 B2 | 8/2012 | Kabzinski et al. |
| 8,310,836 B2 | 11/2012 | Shuette |
| 8,358,499 B2 | 1/2013 | Jacobs et al. |
| 8,559,684 B1 * | 10/2013 | Nechyba ............ G06K 9/00926 382/118 |
| 10,587,596 B1 * | 3/2020 | Sahar ................ H04L 63/08 |
| 2004/0186953 A1 | 9/2004 | Bress et al. |
| 2005/0172144 A1 | 8/2005 | Shao |
| 2005/0216685 A1 | 9/2005 | Heden et al. |
| 2008/0059740 A1 | 3/2008 | Madathilparambil George et al. |
| 2009/0037750 A1 | 2/2009 | Boerger |
| 2009/0106480 A1 | 4/2009 | Chung |
| 2009/0113114 A1 | 4/2009 | Berenbaum et al. |
| 2009/0216916 A1 | 8/2009 | Jang et al. |
| 2010/0306551 A1 | 12/2010 | Meyer et al. |
| 2011/0138141 A1 | 6/2011 | Batifoulier et al. |
| 2011/0162077 A1 | 6/2011 | Kadam |
| 2011/0295903 A1 * | 12/2011 | Chen ................ G06F 16/285 707/794 |
| 2012/0166746 A1 | 6/2012 | Amar et al. |

FOREIGN PATENT DOCUMENTS

| | | |
|---|---|---|
| JP | 63-273291 A | 11/1988 |
| WO | 02095550 A2 | 11/2002 |

OTHER PUBLICATIONS

Addonics Technologies, Snap-In Double Drive, retrieved from the Internet on Jan. 14, 2013, from URL: http://www.addonics.com/products/ae25snap2sa.php, 3 pages.

BYTECC Dual 2.5" SATA Hard Drive Mobile Rack—Fits one 3.5" PC Case Drive Bay, retrieved from the internet on Jan. 14, 2013, from URL: http://pcdirect.com/bydu2sahadrm.html, 2 pages.

CRU DataPort, DataPort® 25D Rugged External Enclosure, retrieved from the internet on Jan. 14, 2013, from URL: www.CRU-DataPort.com, 6 pages.

ICY DOCK MB990SP-B dual 2.5inch to 3.5-inch bracket, retrieved from the internet on Jan. 14, 2013, from URL: http://www.addonics.com/products/ae25snap2sa.php, 2 pages.

Kingwin, HDCV-2 Dual 2.5" to 3.5" SATA HDD Converter w/ Raid, retrieved from the Internet on Jan. 14, 2013, from URL: http://www.kingwin.com/products/cate/mobile/racks/hdcv_2.asp, 1 page.

Other World Computing, OWC Mercury Elite-Al Pro Dual Mini Quad-Interface Storage Devices, retrieved from the internet on Jan. 14, 2013, from URL: http://www.itechnews.net/2010/12/20/owc-mercury-elite-al-pro-dual-mini-quad-interface-storage-devices/, 2 pages.

Wiebetech, Forensic UltraDock v4 Quick Start Guide, retrieved from the internet Feb. 20, 2015, from URL: http://www.wiebetech.com/software/forensic_software_utility.php, 2 pages.

* cited by examiner

STATUS OF CONNECTED DRIVE CONTROLLERS

| NAME | GROUP | MODE ADM/LOCK | USER | KEY RESET | KEY LOAD | PAIRED | REMOVE | LOCAL | IP ADDRESS | MAC ADDRESS | LAST ADMIN | LAST LOCK |
|---|---|---|---|---|---|---|---|---|---|---|---|---|
| EAST-1 | EAST | ☐☐ | FRED | ☐ | ☐ | YES | ☐ | NO | 192.168.0.14 | 00:0A:95:9D:68:16 | 1504231346 | 1504231722 |
| EAST-2 | EAST | ☐☐ | MAY | ☐ | ☐ | YES | ☐ | NO | 192.168.0.23 | 00:0A:95:9D:68:6F | 1507060843 | 1507070648 |
| EAST-3 | EAST | ☐☐ | JILL | ☐ | ☐ | YES | ☐ | NO | 192.168.0.7 | 00:0A:95:9D:68:85 | 1507051457 | 1507052216 |
| WEST-1 | WEST | ☐☐ | JIM | ☐ | ☐ | YES | ☐ | NO | 192.168.0.156 | 00:0A:95:9D:68:8A | 1506261013 | 1506110437 |
| WEST-2 | WEST | ☐☐ | BILL | ☐ | ☐ | YES | ☐ | NO | 192.168.0.163 | 00:0A:95:9D:68:3E | 1506241532 | 1506250927 |

WRITE LOCK ALL ☐

SYSTEMS AND METHODS FOR SECURING STORED COMPUTER FILES FROM MODIFICATION

RELATED APPLICATIONS

This application is a continuation of U.S. patent application Ser. No. 14/799,524, filed Jul. 14, 2015, issuing on Jul. 2, 2019 as U.S. Pat. No. 10,339,328, which claims the benefit of U.S. Provisional Application No. 62/024,929, filed Jul. 15, 2014, which applications are incorporated herein by reference in their entireties for all purposes.

FIELD

This disclosure relates to computer data storage systems. More specifically, the disclosed embodiments relate to systems and methods for protecting computer files stored on a data storage area of a data storage system by securing the files from modification.

INTRODUCTION

Malware, short for malicious software, is software used to disrupt computer operation, gather sensitive information, or gain access to private computer systems. Malware is defined by its malicious intent, acting against the requirements of the computer user. Other forms of software can also cause unintentional harm due to some deficiency. The term badware is sometimes used and applied to both true malware and unintentionally harmful software.

Malware may be stealthy, configured to steal information or spy on computer users for an extended period without their knowledge, or it may be designed to cause harm, often as sabotage or to extort payment. "Malware" is thus an umbrella term used to refer to a variety of forms of hostile or intrusive software, including computer viruses, worms, trojan horses, ransomware, spyware, adware, scareware, and other malicious programs. It can take the form of executable code, scripts, active content, and other software. Malware is often disguised as, or embedded in, non-malicious files.

Malware attacks occur by adding an executable file or routine in to an operating system or computer program. When that operating system is "booted" or a program is launched, the malware becomes operational and will perform whatever tasks it was designed to perform—normally something that is not desired by the user of the computer system. Left unguarded, personal and networked computers can be at considerable risk against these threats.

SUMMARY

The present disclosure provides apparatus, systems, and methods for protecting computer files from modification. In some embodiments, a control system for securing computer files from modification, may include a control circuit configured to be placed operatively between a computer-system processor and both a first internal data storage area and a non-volatile second internal data storage area physically separate from the first data storage area. The control circuit may operatively couple the processor to the first and second internal data storage areas, and may operate in a first mode to allow communication from the processor to the first internal data storage area of all commands received from the processor, to block communication to the second internal data storage area of commands that are configured to modify the second internal data storage area, and to allow communication to the second internal data storage area of commands received from the processor that are configured not to modify the second internal data storage area. The control circuit may be further configured to operate in a second mode to allow communication from the processor to the first and second internal data storage areas of all commands received from the processor.

In some embodiments, a computer system for securing computer files from modification may include a processor; at least a first data storage area operatively coupled to the processor; a non-volatile second data storage area; and a control circuit. The non-volatile second data storage area may be physically separate from the at least a first data storage area. The second data storage area may store files that are executable by the processor, including executable files of an operating system configured to save temporary files on the at least a first data storage area. The control circuit may operatively couple the second data storage area to the processor, and may be operable in at least a first mode in which the control circuit is configured to block commands received from the processor and configured to modify the second data storage area from being communicated to the second data storage area.

In some embodiments, a method for securing computer files from modification may include routing communications between a processor of the computer system and the first and second internal data storage areas through a control circuit operatively independent of the processor. Communication to the second internal data storage area of commands received from the processor that are configured to modify the second internal data storage area may be blocked by the control circuit when the control circuit is operating in a first mode. Communication to the second internal data storage area of commands received from the processor that are configured not to modify the second internal data storage area may be allowed when the control circuit is operating in the first mode. Communication to the first internal data storage area of all commands received from the processor may be allowed when the control circuit is operating in the first mode. Additionally, communication to the first and second internal data storage areas of all commands received from the processor may be allowed when the control circuit is operating in a second mode.

In some embodiments, a method for securing computer files from modification may include routing communications between a processor of the computer system and a non-volatile second data storage area of physically distinct first and second data storage areas through a control circuit operatively independent of the processor. The control circuit may block all commands from the processor configured to modify the second data storage area from being communicated to the second data storage area when the control circuit is operating in a first mode. In some embodiments, executable files of an operating system of a computer system may be configured to save temporary files on at least a first data storage area. Executable files of the operating system may be stored on the second data storage area. During operation of the computer system, the temporary files of the operating system may be stored on the first data storage area.

In some embodiments, a computer system may include at least one host computer and a user-interface system. The at least one host computer may have a host processor configured to be operatively coupled to a network system, and a data storage system. The data storage system may include at least a first data storage area and a control circuit. The control circuit may provide operative communication between the host processor and the first data storage area and may be configured to be operatively coupled to the network system independent of the host processor. The first data storage area may store executable files of a host-processor operating system, the host-processor operating system being configured to store temporary files of the operating system on at least a second data storage area in operative communication with the host processor. The user-interface system may include a user-interface device configured to be operatively coupled to the network system for communication with the control circuit. The user-interface device may be selectively operable in response to an input received from a user to place the control circuit into an operating mode in which the control circuit blocks commands sent by the host processor and configured to modify the first data storage area from being communicated to the first data storage area.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 15 is an example of an interactive display of a user-interface computer for use in the user-interface system of FIG. 13.

DESCRIPTION

Overview

Figure 1:
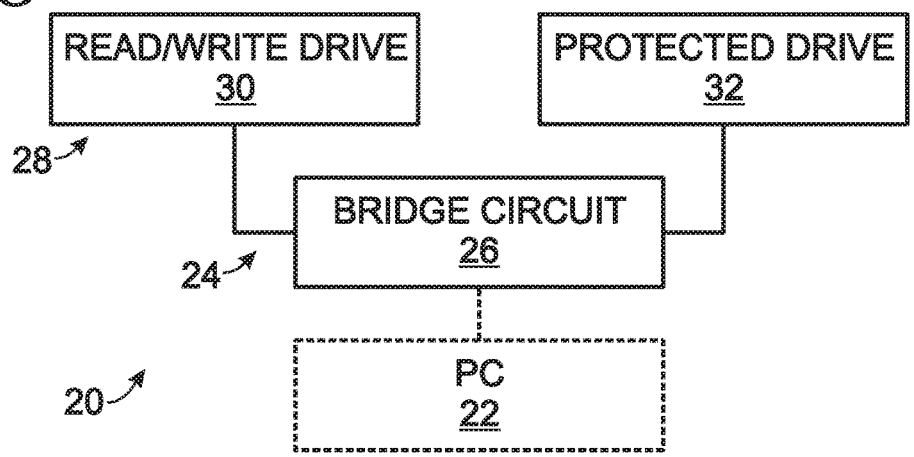
FIG. 1 is a block diagram of an illustrative malware-resistant data storage system.

Various embodiments of computer systems or data storage systems resistant to malware are described below and illustrated in the associated drawings. Unless otherwise specified, such a computer system or data storage system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other data storage systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Computer methods, computer systems, or computer program products disclosed herein may take the form of an entirely hardware embodiment or an embodiment combining software (including firmware, resident software, microcode, and the like) and hardware aspects, all of which may generally be referred to herein as a "circuit," "module," or "system." A computer program product may be embodied in a computer-readable medium (or media) having computer readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. A computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present invention may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Flowchart illustrations and/or block diagrams are described and illustrated for methods, apparatuses, systems, and/or computer program products. Each block and/or combination of blocks in a flowchart and/or block diagram may be implemented by hardware and/or computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary computer and data storage systems as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

An example of a malware-resistant computer system is shown schematically in FIG. 1 and generally indicated at 20. System 20 may include a host computer 22 having a resident processor (not shown), a data storage system 24 illustrated as a bridge circuit 26, and one or more data storage areas 28, such as a drive 30 and a drive 32. Each of the data storage areas may include any suitable physical or virtual computer-readable storage medium or portion of a storage medium configured for storage and retrieval of digital information. For example, the drives may include a hard disk drive (HDD), a solid state drive (SSD), a floppy drive, an optical disk drive, a network drive, memory, cache, or the like, or any combination of these. In this example, each of drives 30 and 32 includes a hard drive having a serial ATA attachment (SATA) interface. However, other drive and/or interface types may be used, e.g., parallel ATA (PATA). For example, a single physical drive may be used, with the physical drive having a two non-overlapping partitions.

Data storage areas 28 are in operative communication with bridge circuit 26, such as by way of a respective cable and/or connector. In some examples, two SATA hard drives plug directly into compatible slots in a frame supporting bridge circuit 26. Bridge circuit 26 may include any suitable electronic circuit(s) configured to interface with drives 30 and 32, to provide various control features described below, and to present an interface to the associated computer 22, such as to the resident processor or motherboard.

Bridge circuit 26 may be configured to selectively transfer commands and messages associated with reading and writing of data between the computer 22 and the data storage areas 28. For example, read requests for either drive may be received by bridge circuit 26 and passed to the data storage area 28 in question without modification or interference. In some examples, one of the two drives 30 and 32 may be designated by system 20 as a write-protected or read-only drive. For example drive 32 may be designated as a protected drive. In this example, write requests for drive 30 (unprotected, read/write) will be received by the control circuit and passed along unchanged. However, any write request directed to drive 32, or other request that would modify drive 32, would be blocked or filtered by the control circuit and never reach drive 32.

The bridge circuit 26 may filter a drive-altering request if it is directed to a write-protected drive. A processor of the host computer 22 attempting to communicate with drive 32 for write access will expect a confirmation message. If the confirmation message is not received, an error may occur and/or write access may be repeatedly attempted. Accordingly, bridge circuit 26 may respond, in addition to blocking the request, with a confirmation message indicating that the write attempt was successful. This feature may be referred to as "spoofing," in that computer 22 is effectively "fooled" into believing that nothing has been blocked or filtered. In some examples, other messages may alternatively or additionally be provided by bridge circuit 26. For example, a message may be communicated indicating that writing activity has been attempted. In some examples, a visual or other human-perceptible indicator may be activated when write access is blocked, such as a flashing LED light.

Bridge circuit 26 may include a security feature. For example, designation or overriding of protected status for drive 32 may require a user to enter into an administrative mode with respect to the bridge circuit. This mode may be enabled, for example, by providing a passcode to the system, such as through a numeric keypad or other user interface. In some examples, as described further below, a passcode may be communicated to the system by causing a separate device to interface with data storage system 24, such as through bridge circuit 26, thereby placing system bridge circuit 26 into administrative mode.

When drive 32 is taken out of protected mode or status, the drive will be treated similarly to drive 30, and data may be written or recorded to drive 32 without any filtering or blocking. Drive 32 may subsequently be redesignated as a protected drive, and bridge circuit 26 will again filter any write requests from host computer 22.

Accordingly, computer system 20, and specifically data storage system 24, may be suitable for preventing successful malware attacks. Malicious software, including viruses, trojans, spyware, rootkits, backdoors, worms, ransomware, and the like, generally requires access to the operating system and/or other executable software on a given computer. Malware generally requires the ability to install executable code, either by modifying existing software or by installing a standalone executable. System 20 facilitates the thwarting of such attacks by allowing a user to place all executable software, including the operating system, onto one drive, then protect that drive. With the drive protected, further modification is prevented, existing software files cannot be changed, and new executables cannot be created on the protected drive. While it may be possible to save executable code onto unprotected drive 30, the operating system may be configured so that the executable code on the unprotected drive would not be executed If executable code on the unprotected drive were to be executed, the executable code would not result in any changes to the operating system or other existing software on the protected drive 30. Accordingly, data and executables on the protected drive remain protected.

In some examples, an executable blocking program may be launched from drive 32 and run in system memory. This blocking program may be configured to prevent execution of any file located on unprotected drive 30. For example, the blocking program may communicate a heartbeat signal to drive 30 which continually resets a firmware timer associated with drive 30 on bridge circuit 26. If the timer ever reaches a terminal state (e.g., a countdown timer elapses fully), then the bridge circuit will halt all input and output operations relating to drive 30. This security measure ensures that the blocking program is active, and that it has not been halted or overwritten, for example, by malware.

Example 2

FIGS. 2-7 show an example of an illustrative malware-resistant computer system 40. Computer system 40 may include a host computer 42, and a data storage system 44 with data storage areas 46. In this example, it will be seen that data storage system 44 may be configured to support dual-drive data storage areas 46. The data storage system 44 may incorporate a write-protected interface, to protect a computer operating system configuration from malware attacks. In a preferred embodiment, two 2.5" drives may be placed within a mechanical "chassis" that meets the standards for 3.5" drives. As a result, this data storage system can be used in any computer system that uses a 3.5" hard drive for its system drive. A hard drive containing the operating system may be generally write-protected, and a separate hard drive containing supporting data may be allowed read/write access.

More specifically, and referring to FIGS. 2-7, in this example data storage areas 46 includes a plurality of drives, including a read/write hard drive 48 and a protectable hard drive 50, each operatively connected to a drive interface circuit 52. A bridge circuit 54 includes a control circuit 56 operatively connected to the drive interface circuit 52, and a user-interface circuit 58. Control circuit 56 may have a data storage area, such as a cache or memory 57. The user-interface circuit 58 may be operatively connected to the control circuit, and may be removable therefrom. In this example, some or all of the components of data storage system 44 may be housed, arranged, or structurally supported by a frame or chassis 60. Circuits in this example may be referred to interchangeably as "circuit boards" or "boards."

An interface cable 62 having a data portion 64 and a power portion 66 may be connectable to data storage system 44, such as through a connection point or points on control circuit 56. Interface cable 62 may provide an interface between host computer 42 and data storage system 44. For example, interface cable 62 may provide an electrical power connection between data storage system 44 and a power source 68 of the host computer, and/or may provide a data connection with a data bus 70 via an input/output unit 72 or similar structure, such that data storage system 44 is placed into operative communication with one or more processors 74 and internal storage area 76, such as memory or cache, of the computer 42. Note that data processing systems are described in greater detail below.

Each of drives 48 and 50 may include any suitable storage area, as described above regarding drives 30 and 32. Additionally, each drive 48, 50 may represent one or more similar drives, and/or one or more virtual partitions therein. However, the data storage area represented by drive 48 is physically distinct from the data storage area represented by drive 50.

In this example, drives 48 and 50 are operatively connected to drive interface circuit 52 at dedicated SATA slots (also termed connectors or ports) 78. Drive interface circuit 52 may be fabricated on a drive interface circuit board that may be a simple backplane supporting SATA slots 78. Drive interface circuit 52 may be operatively connected to control circuit 56 by any suitable connector or connectors 80. For example, connectors 80 may include a pair of right angle headers such as those shown in FIGS. 4-6. Note that circuit boards supporting drive interface circuit 78 and control circuit 56 are oriented orthogonal to one another in this example. However, other orientations may be possible, including fabricating the two circuits on a single circuit board.

Control circuit 56 may include any suitable electronic and related components configured to relay read/write requests between processor 74 and drives 48 and 50, to handle transitions between an administrative mode and an operational mode, to filter any write requests directed to protectable drive 50 if in operational mode, and to provide "write request successful" messages to the processor if appropriate. Control circuit 56 also includes one or more external slots or connectors 82, or other communication port, configured to provide a standard SATA interface for interface cable(s) 62. Control circuit 56 may be configured to be transparent to processor 74. In other words, processor 74 may be unaware of the existence of the circuit, such that control circuit 56 is configured to make it appear to processor 74 that drives 48 and 50 are connected directly to the host computer 42. In some examples, the two data storage areas may appear to be as separate partitions on the same single physical drive.

Figure 5:
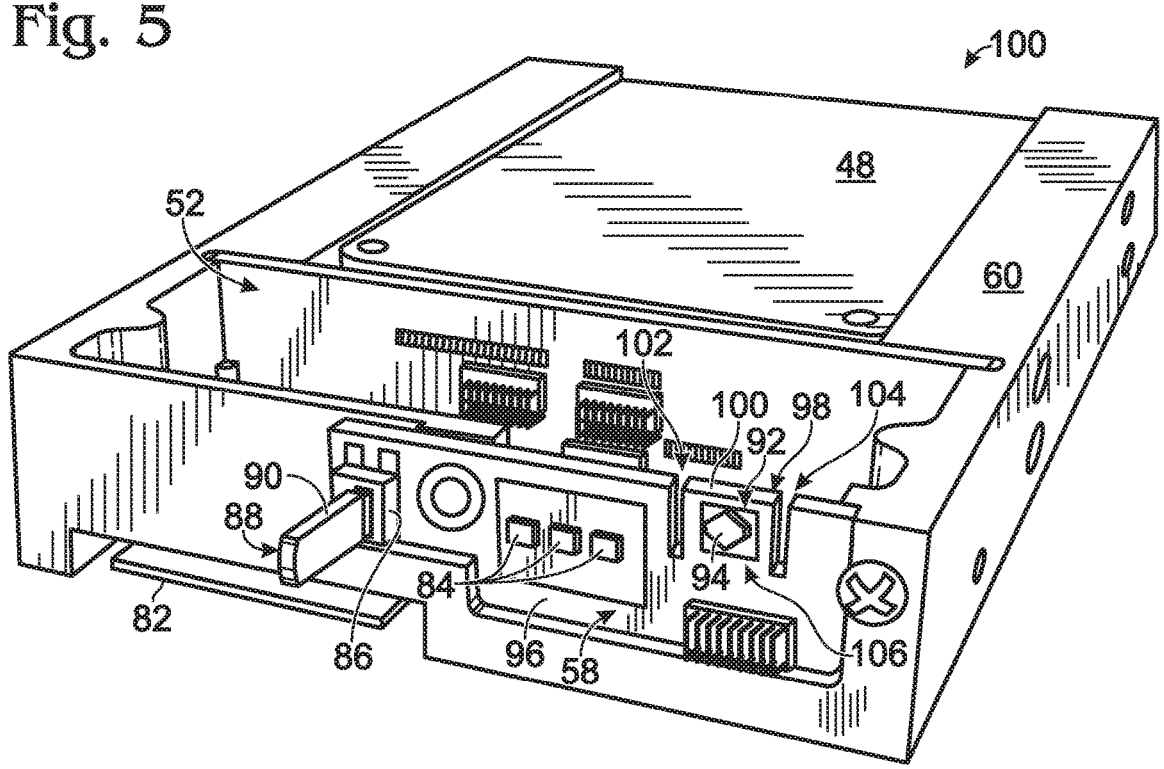
FIG. 5 is an isometric view of the system of FIG. 4 showing details of an illustrative interface circuit with a security key installed in a communication port.

An example of user interface circuit 58, also referred to as a display board or user-interface (UI) board, is shown in detail in FIG. 5. User interface circuit 58 may include any suitable electronic components and interfaces configured to facilitate status indication and provide an interface for the user to enable and disable administrative mode or other functions for data storage system 44. User interface circuit 58 may be removably connected to control circuit 56, such as by a pluggable connector. Accordingly, user interface circuit 58 may not be necessary for the normal operation of data storage system 44, but could be removed and reinstalled as needed for security reasons. An example of a wiring configuration for the board relative to the main circuit is provided in the accompanying appendix.

User interface circuit 58 may include one or more status indicators 84 such as LEDs of any suitable color. For example, LEDs may be used to indicate control circuit activity, or data transfer between the control circuit and read/write drive 48 or protected drive 50. User interface circuit 58 may include an interface for secure communication of a passcode, such as a receptacle 86. Receptacle 86 may include any suitable receptacle or connector configured to receive a corresponding device containing the passcode for digital transmission. For example, receptacle 86 may include a female mini-USB connector configured to mate with a code storage device 88, such as mini-USB flash drive or authentication key 90.

User interface circuit 58 may include a sacrificial circuit element 92 or manual interface component, such as a user-actuatable element, such as a switch or a pushbutton 94, configured to communicate confirmatory information or to effect the communication of information from the user, such as to communicate an authentication key code from authentication key 90, to control circuit 56. For example, transfer of a passcode from authentication key 90 to control circuit 56 through user-interface circuit 58 may be indicated by pressing button 94.

Data storage system 44 may include a circuit board 96 on which user interface circuit 58 is supported. Circuit board 96 may include a sacrificial board element 98, such as a destructively removable portion or tab 100. As shown in FIG. 5, tab 100 may be formed by including slots 102 and 104 delimiting the sides of tab 100 and a row of holes 106 delimiting the bottom of tab 100. The slots and holes define and weaken the attachment of the tab to circuit board 96. Button 94 may be included on tab 100, as shown particularly in FIG. 5. Accordingly, breaking off tab 100 may provide added security by eliminating the ability to confirm or initiate loading of a different passcode. For example, after installing the operating system and any additional software onto drive 50, authentication key 90 could be removed by bending the tab 100 along the series of holes 106 far enough to break the tab off of the circuit board 96. This would remove push button 94 from the user interface circuit 58 and prevent further modification of protected drive 50 by an authentication key different from the authentication key last used, without installing a replacement board 96 that has the tab 100 and resident push button 94 intact.

Figure 3:
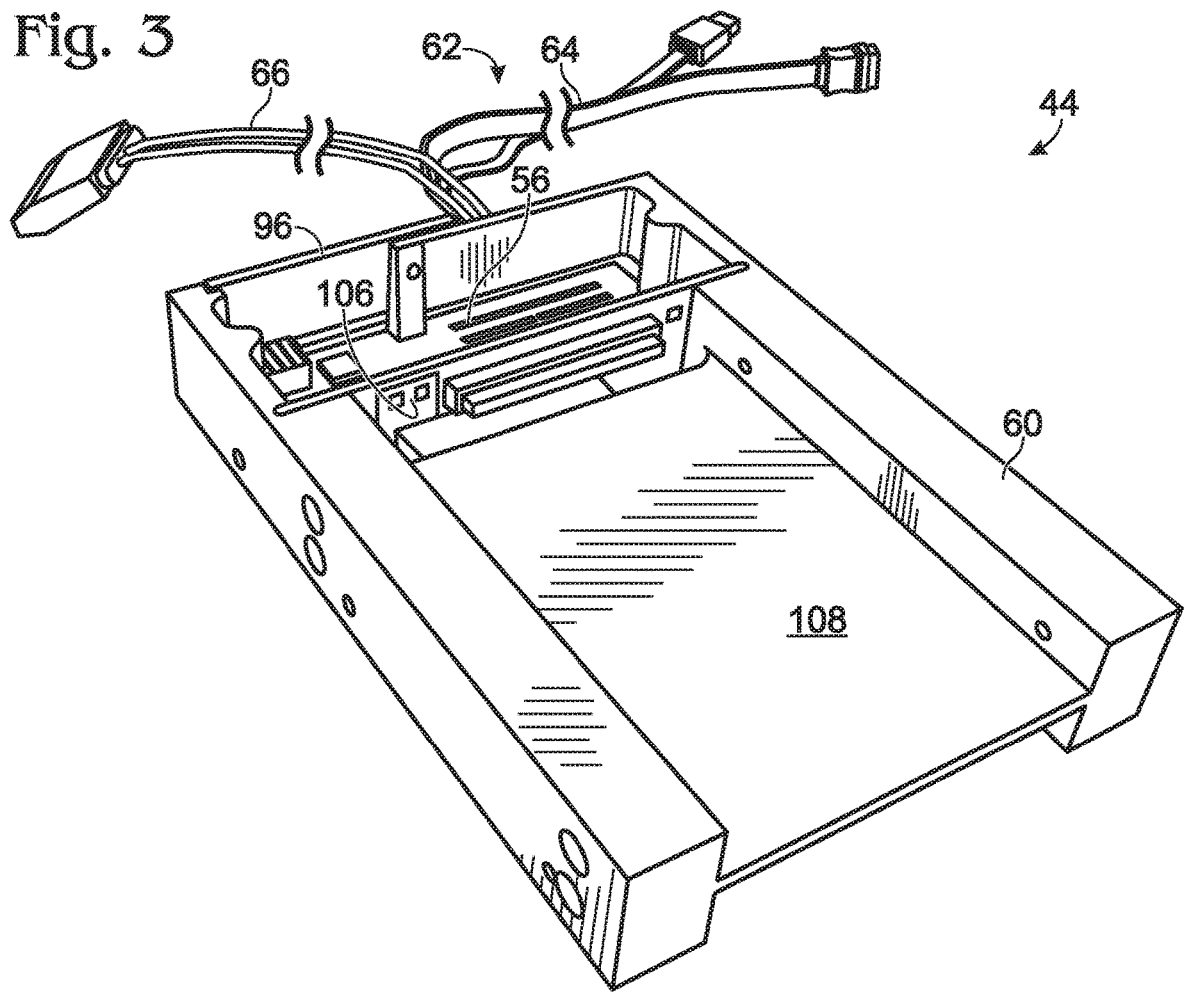
FIG. 3 is an isometric view showing one embodiment of an illustrative malware-resistant data storage system.
Figure 2:
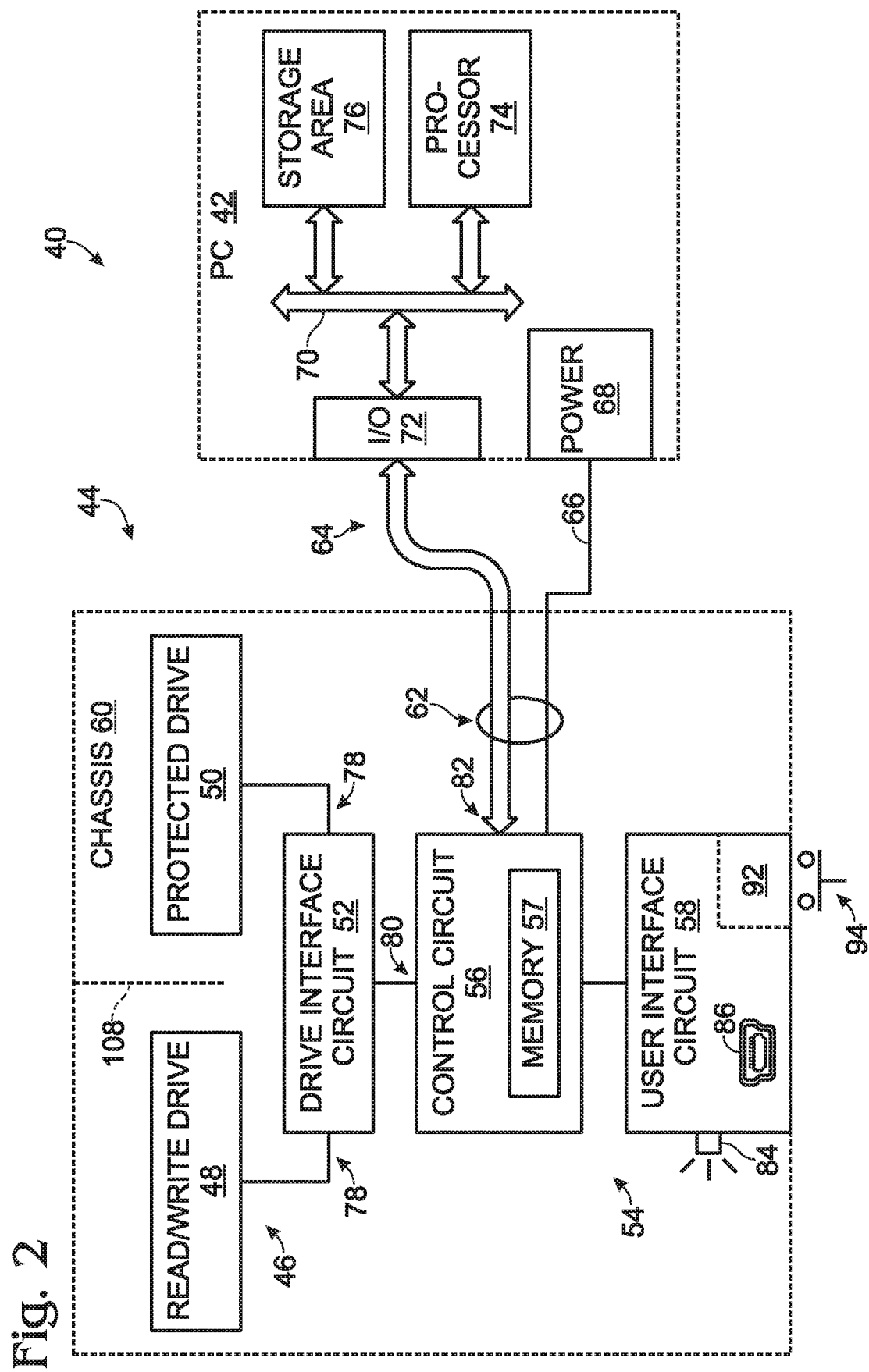
FIG. 2 is a block diagram of an illustrative malware-resistant data storage system, showing relationships between various components.
Figure 4:
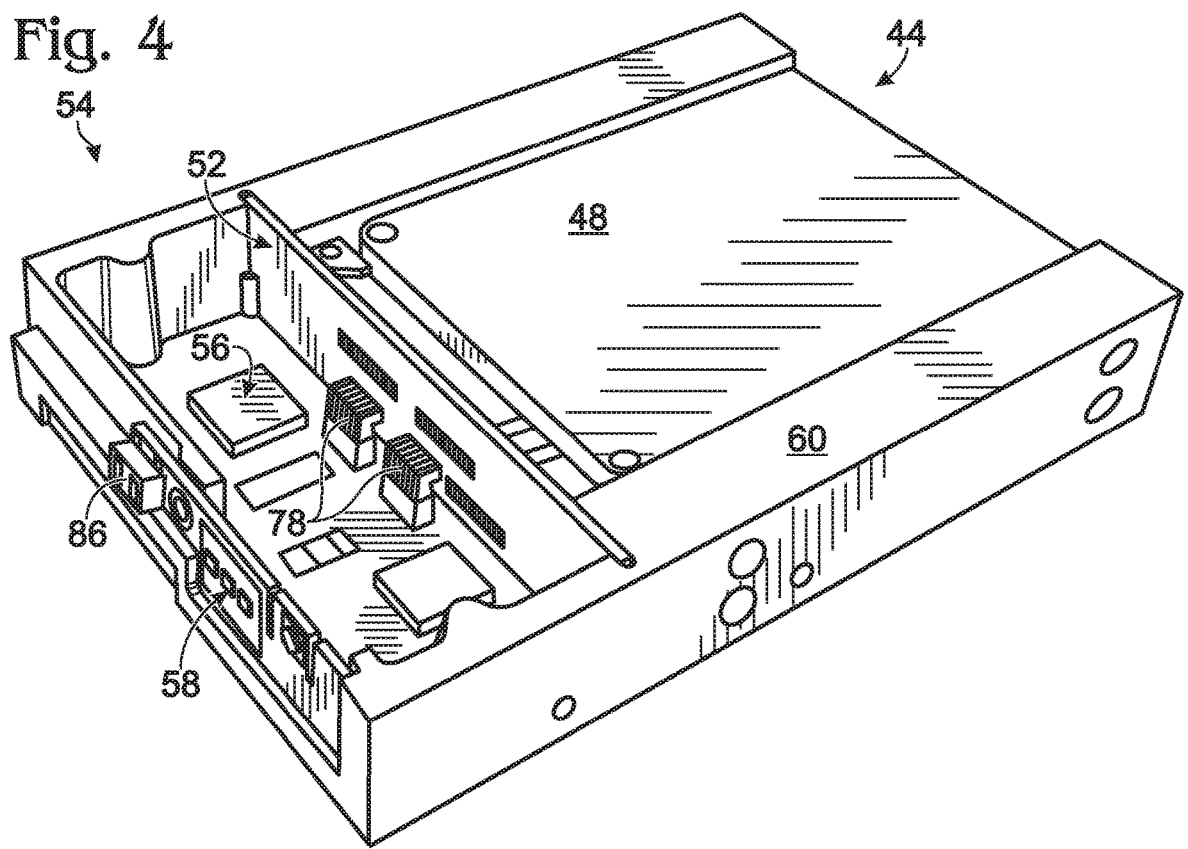
FIG. 4 is an isometric view of the system of FIG. 3, with an illustrative hard drive installed.

Some or all of the aforementioned components of data storage system 44 may be housed or supported by chassis 60, as shown in FIGS. 3-5. Chassis 60 may include any suitable structure configured to support a plurality of storage drives, circuit boards, and/or connection slots such as those described in this example. Chassis 60 may comprise an aluminum frame, or any other suitable material. Chassis 60 may include one or more fastening or mounting points for various components. Chassis 60 may be configured to fit into a standard bay of a personal computer. For example, chassis 60 may be configured to fit into a standard 3.5-inch hard drive bay. In this example, chassis 60 is configured to accept and support drives 48 and 50 as two 2.5-inch storage drives, on either side of a partition, such as a common floor or wall 108. Accordingly, system 100 may include two 2.5-inch drives in a single 3.5-inch chassis configuration.

Example 3

Figure 6:
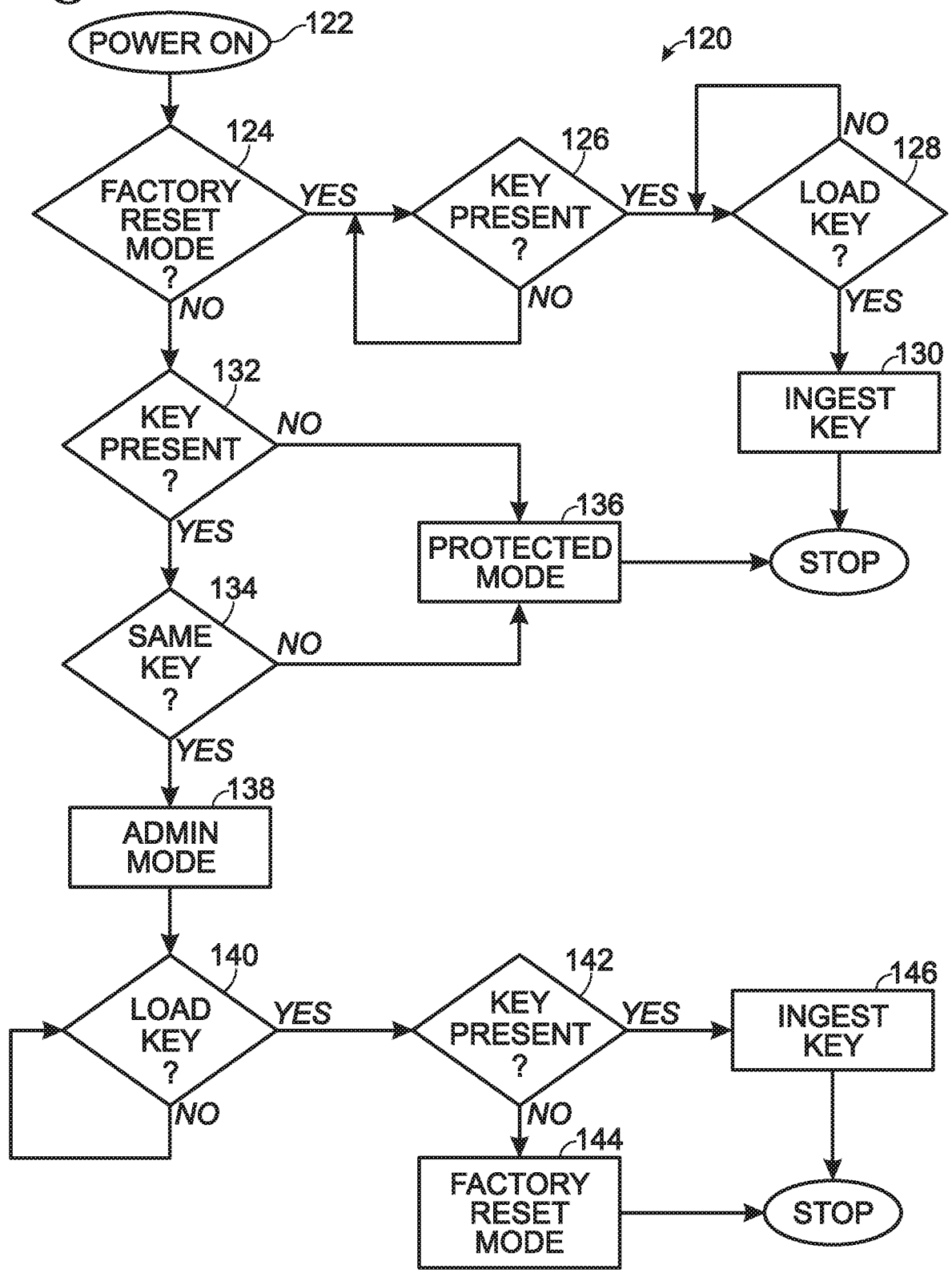
FIG. 6 is a flow chart illustrating various steps performed in an illustrative security-related process for interacting with a data storage system.
Figure 9:
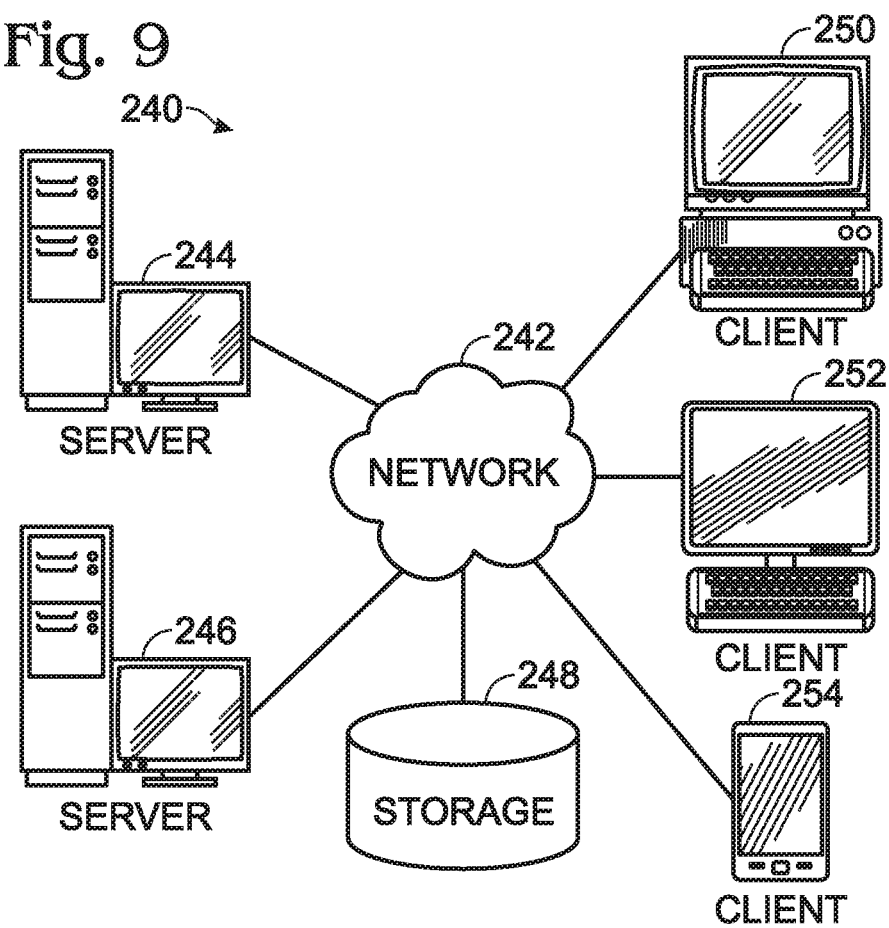
FIG. 9 is a schematic representation of an illustrative network system.

FIG. 6 depicts a flowchart illustrating steps performed in an exemplary method for securely enabling and disabling administrative mode or changing an authentication key code in a malware-resistant data storage system such as has been described. Other examples may include different steps, or more or fewer steps. FIG. 9 depicts multiple steps of a method, generally indicated at 120, which may be performed in conjunction with a malware-resistant data storage system. Although various steps of method 120 are described below and depicted in FIG. 6, the steps depicted need not necessarily all be performed, and in some cases may be performed in a different order than the order shown.

Method 120 is shown in FIG. 6 in terms of system functionality, and is described in detail below. From a user perspective, however, method 120 may proceed as follows. A user determines whether a passcode change is desired or whether initial loading of a passcode is required. Initial loading or subsequent changing of the passcode may require the system to be in administrative mode, or (for initial loading) in factory reset mode. If this operation is desired and the proper mode is enabled, the user then inserts a new authentication key (such as USB authentication key 90 described above) or other code storage device 88 into key receptacle 86 on the data storage system 44. This receptacle may be located on the user interface circuit 58.

Placing the key into the receptacle enables digital communication between the authentication key 90 and the control circuit 56. For example, the contents of the authentication key 90 may become accessible by the control circuit 56. However, in this example, for security reasons, the authentication key triggers a transfer of its contents when there is an associated user action and the control circuit 56 retrieves the authentication key code and stores it in memory 57. Memory 57 is preferably not readable or otherwise accessible by a user or the host computer or processor. Specifically, once the authentication key is inserted, the user presses the key load button 94 on the display circuit board 96 containing the user interface circuit 58 to initiate loading of the passcode from the authentication key 90 into the control circuit 56. This passcode may be a randomly generated multi-bit number (e.g., 2,048 bits), such as may be generated and loaded onto a USB authentication key 90 by an AES key programmer device. The passcode may also be an encryption code, in which case the key storing it may be referred to as a security key, as described further with reference to FIG. 7.

Pressing the key load button 94 initiates a loading of the authentication code into the control circuit 56. The authentication code may be stored or a hash of the actual code may be stored. For convenience, the code and the hash of the code may each be referred to as the passcode. The passcode may be stored in the memory 57 of the control circuit 56, allowing the display circuit board 96 to be subsequently removed if desired. Alternatively, the pushbutton 94 may be disabled on the display circuit board 96, such as by physically removing the portion of the board, tab 100 that includes the pushbutton 94, as discussed above.

The user may then power down the data storage system 44, such as by removing power from the host computer 42. The user decides whether administrative mode is desired. If so, the authentication key is inserted into the receptacle 86

(or left there if present), and power is restored. When the data storage system 24 boots up, the control circuit 56 verifies that the inserted authentication key 90 contains the proper passcode, and the data storage system 44 will be operable in administrative mode. This includes full read/write access to all attached data storage areas 46, and may be enabled by the user for tasks such as software (including OS) installation, updating, or reconfiguring.

If the user powers the data storage system 44 down and then desires to disable administrative mode, the user removes the authentication key 90 from the receptacle 86 and restores power. The authentication key 90 should then be kept in a secure location to prevent unauthorized use. Upon restoration of power, the data storage system checks to see if an authentication key with the proper passcode is in communication with the control circuit. If no authentication key is present, or the wrong authentication key is present, the data storage system 44 operates in write-protect mode (i.e., with administrative mode disabled). In other words, the protected drive 50 is protected from writing operations, and any attempts by the host processor 74 to write to the protected drive 50 is blocked and spoofed.

Accordingly, referring now to method 120 illustrated FIG. 6, at power-on 122 of the data storage system 44, the control circuit 56 checks at step 124 to see if it is in factory reset mode. If so, this mode enables loading of a new authentication code. Accordingly, at step 126, the control circuit 56 enters a looping or waiting condition wherein it monitors for an indication that an authentication key 90 is present. In response to an authentication key 90 being present, the control circuit 56 enters another looping or waiting condition at step 128, this time monitoring for an indication that the "load key" pushbutton 94 has been pressed or otherwise activated. Once the key-load pushbutton 94 has been activated, step 130 includes ingesting or otherwise loading the key code into memory 57 of the control circuit 56. This is done, for example, when loading an authentication key 90 into a new or reset data storage system 44.

If it is determined at step 124 that the control circuit 56 is not in factory reset mode, the control circuit checks at step 132 for the presence of an authentication key 90. If an authentication key 90 is present, step 134 includes comparing the contents of the authentication key 90 with the stored authentication code value. The comparison may be accomplished by comparing a hash of the authentication code with a hash of the stored value or by comparing the authentication code in the authentication key 90 with the stored authentication code.

If the authentication codes do not match, or if it is determined in step 132 that no authentication key 90 is present, then the control circuit 56 enters the protected mode at step 136. If the authentication key 90 is present and the authentication code matches the stored passcode (e.g., a hash of the authentication code on the authentication key 90 matches the hash stored in memory 57), then the control circuit 56 enters administrative mode at step 138.

In administrative mode, the control circuit 56 continues to monitor for a key load event at step 140. In other words, the system watches for load pushbutton 94 activation. If the pushbutton 94 is pressed, then the control circuit 56 checks at step 142 for the presence of an authentication key 90. If no authentication key 90 is present, then at step 144, the control circuit 56 enters factory reset mode. This is one way that the control circuit 56 would be in such a mode at power-up described with respect to steps 122 and 124. If instead an authentication key 90 is present, then at step 146 the system would load or ingest the contents of the key to change the existing stored key code.

When in administrative mode, the computer operating system, application programs, other executable files, and any data files that are not to be modified, may be loaded into a protected drive, such as protected drive 32 of computer system 20 or protected drive 50 of computer system 40. The operating system can then be configured to store files that are to be modified, such as temporary files, on an unprotected drive, such as read/write drive 30 of computer system 20 or read/write drive 48 of computer system 40. This process is preferably performed when the computer system is not connected to the Internet or to another network until fully configured and the bridge circuit is protecting the protected drives in read-only or protected mode.

As an example, a Microsoft Windows® operating system may be configured to write temporary data and files to the read/write data storage area by configuring advanced system settings. Paging for the C: drive is deselected. A paging file size is then input for the drive that is designated as the read/write data storage area. Folders are then set up on the read/write data storage area titled "TEMP" and "TMP." Environmental Variables are then selected, and the TEMP and TMP folders are designated for both User and System. It further may be desirable to disable services, such as automatic updates, for the operating system or programs stored on the protected drive. Since the protected drive stores the operating system, it may also be preferable to set the power control for the protected drive so that it does not go into a sleep or hibernation mode.

Example 4

Figure 7:
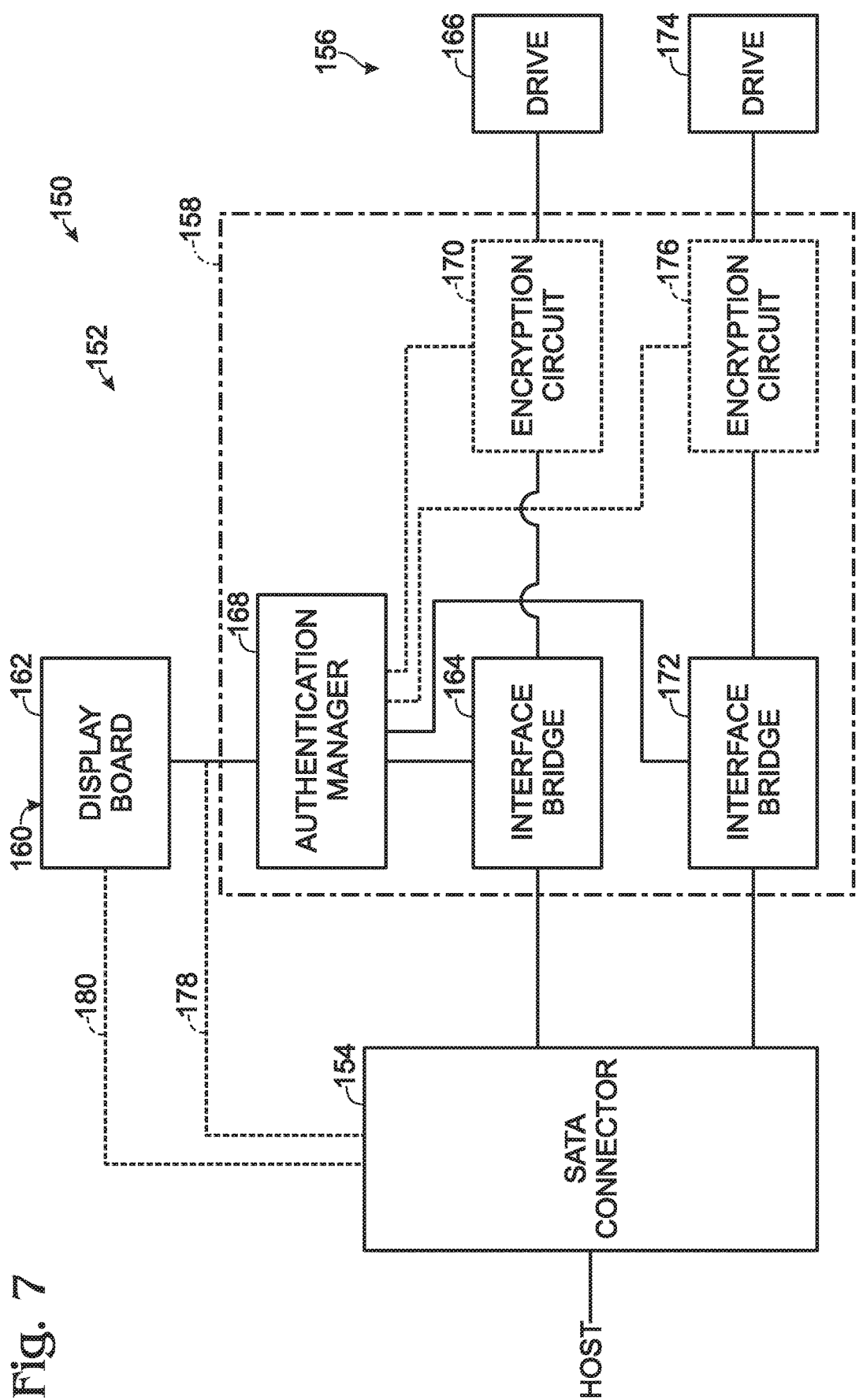
FIG. 7 is a block diagram of an illustrative control circuit suitable for use in a malware-resistant data storage system.

FIG. 7 shows an example of an illustrative data storage system 150 for securing computer files from modification. Data storage system 150 includes a bridge circuit 152 for coupling a computer connector, such as a SATA connector 154, to one or more data storage areas 156. Bridge circuit 152 may include a control circuit 158 and a user interface circuit 160 mounted on a display circuit board 162. Control circuit 158 is an example of control circuit 56 described above. Control circuit 158 includes a first drive interface bridge 164 operatively connected between SATA connector 154, to which a host computer or processor is connected during use, and a data storage area 156 in the form of a first data storage drive 166. First drive interface bridge 164 may include any suitable processor configured to selectively operate in either of two modes: (1) a first, protected mode in which the processor traps write or other storage-area-modifying commands from a host computer (e.g., via a direct memory access (DMA) controller communication), throws away the data to be written in the case of a write command, and provides a status completion message of "good" to the host; and (2) a second, unprotected mode in which the processor essentially passes communications through uninterrupted, including write or other modifying requests from the host computer. In some examples, interface bridge 164 may include a memory unit (e.g., flash chip) in communication with the resident processor, the memory unit containing instructions executed by the processor (e.g., to carry out the functions just described). Drive interface bridge 164 may include one or more registers configured to buffer data.

Control circuit 158 further includes an authentication manager circuit 168 in communication with drive interface bridge 164. Authentication manager circuit 168 may include any suitable components configured to manage authentication of the passcode entered through the user-interface circuit 160 via display board 162, such as described in Examples 1 and 2. Selection of the first or second mode of drive interface bridge 164 may be effected by authentication manager circuit 168. Drive interface bridge 164 may remain in the first mode unless a matching passcode is presented to authentication manager circuit 168, in which case an output of authentication manager circuit 168 places drive interface bridge 164 into the second mode (see Example 2 for a more detailed example).

Optionally, an encryption circuit 170 may be included such that data stored on drive 166 may be encrypted. For example, the passcode provided through authentication manager circuit 168 may be used as an encryption code for cryptographically encoding and decoding the stored information, or a separate encryption code may be stored, such as on the same authentication key, on a separate authentication or security key, or in a memory of the authentication manager circuit 168.

In some examples, a second drive interface bridge circuit 172 substantially identical to first drive interface bridge circuit 164 is included between SATA connector 154 and a second data storage area 156 in the form of a second data storage drive 174. Consistent with the examples described above, interface bridge 172 may simply pass communications between the host computer and data storage drive 174, making data storage drive 174 a readable/writeable drive. However, interface bridge 172 may include any of the same functions and modes described regarding interface bridge 164. Accordingly, interface bridge 172 may also be in communication with authentication manager 168.

In some examples, a user may select which of drives 166 and 174 is to be designated as the protected drive. In yet further examples, the read/write unprotected drive 174 may have some level of protection provided. For instance, interface bridge 172 under control of authentication manager 168 may block any executable programs from being stored on drive 174, or may block execution of any executable programs stored on drive 174. In some embodiments, the operating system (OS) may be forced to execute programs only if they are located on the protected drive 166. In these embodiments, even if an attack results in storage of malware on the unprotected drive, the OS would not authorize execution of the code. A further level of security may be provided by allowing communication with drive 174 only within a limited time period of receipt of a status signal from authentication manager 168. If the signal is not received within the time limit, access may be denied. This would then provide a level of assurance that the authentication manager circuit 168 has not been compromised.

In some examples, an additional or alternative encryption circuit 176 may be included to encrypt and decrypt data on drive 174. This encryption circuit may be substantially identical to encryption circuit 170 already described.

Figure 10:
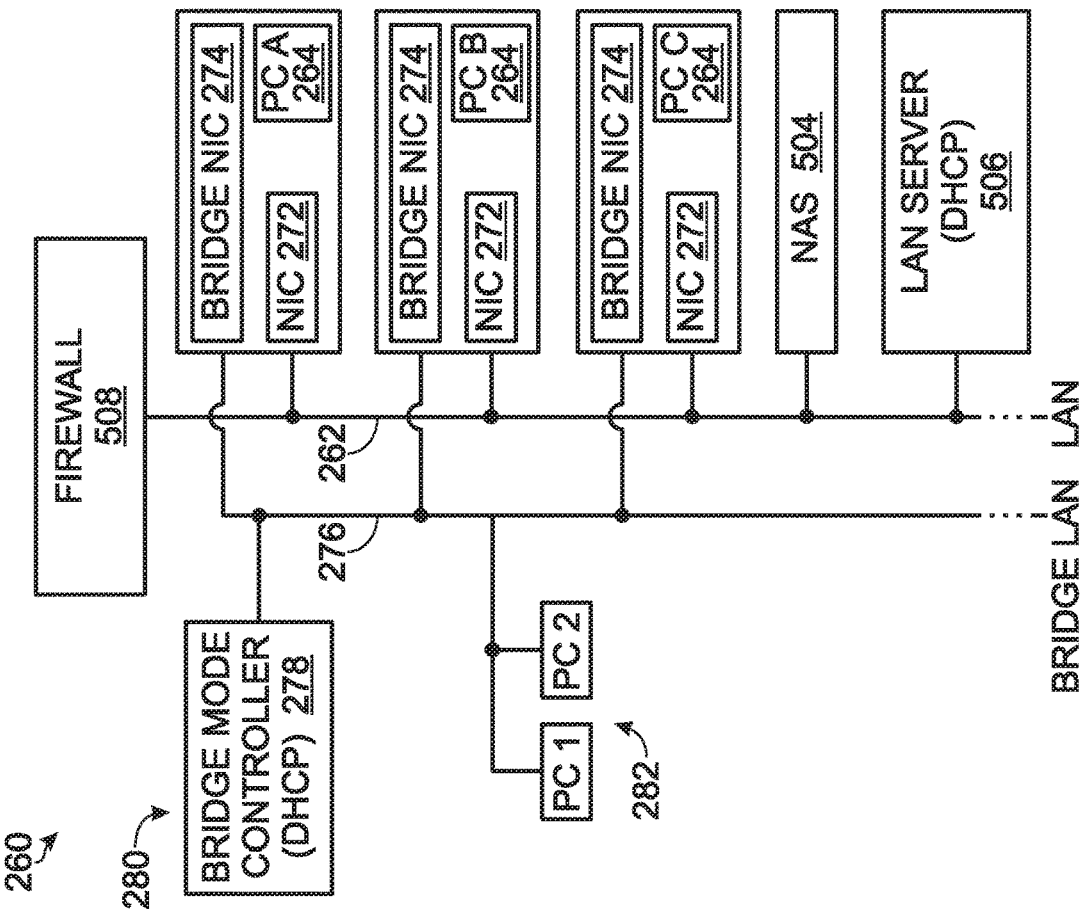
FIG. 10 is a schematic diagram of an illustrative computer network system including computers having malware-resistant storage systems, and a malware-resistant storage system controller isolated from a main network to which the computers are connected.

A dashed lines 178 and 180 shown in FIG. 10 connects authentication manager 168 to SATA connector 154 and SATA connector 154 to user-interface circuit 160. This line indicates that the user-interface circuit 160, in some examples, may be operatively connected to control circuit 158 through the SATA connector 154 rather than by a direct connection. This may be done, for example, to facilitate disposition of the display board 162 in a more accessible and/or visible location remote from control circuit 158.

Furthermore, the connection of the user-interface circuit 160 to authentication manager 168 may be provided via a connector on control circuit 158 and SATA connector 154. Display board 162 may plug into the connector on the control circuit 158. Alternatively, the connection can be made through the interface bridge 164 such that the device may be mated with other hardware (e.g., a removable drive enclosure). In some examples, SATA connector 154 may be a SAS connector having two ports for data connection—a primary port and a secondary failsafe port. The data storage system may utilize these two ports to independently break out the protected and unprotected drive interfaces. One or more of the power and ground pins may then be used for interfacing with the authentication manager 168.

Another feature of the control circuit 158 is that the mode of the protected data storage drive 166 cannot be altered by a host computer. The mode authentication manager circuit is independent of the host-accessible HDD data and control interface. With no interconnection between the HDD and the mode authentication manager, software (whether "authorized" or malware) is unable to place the control circuit 158 into administrative mode, which would make the protected drive 166 vulnerable to attack.

Example 5

Figure 8:
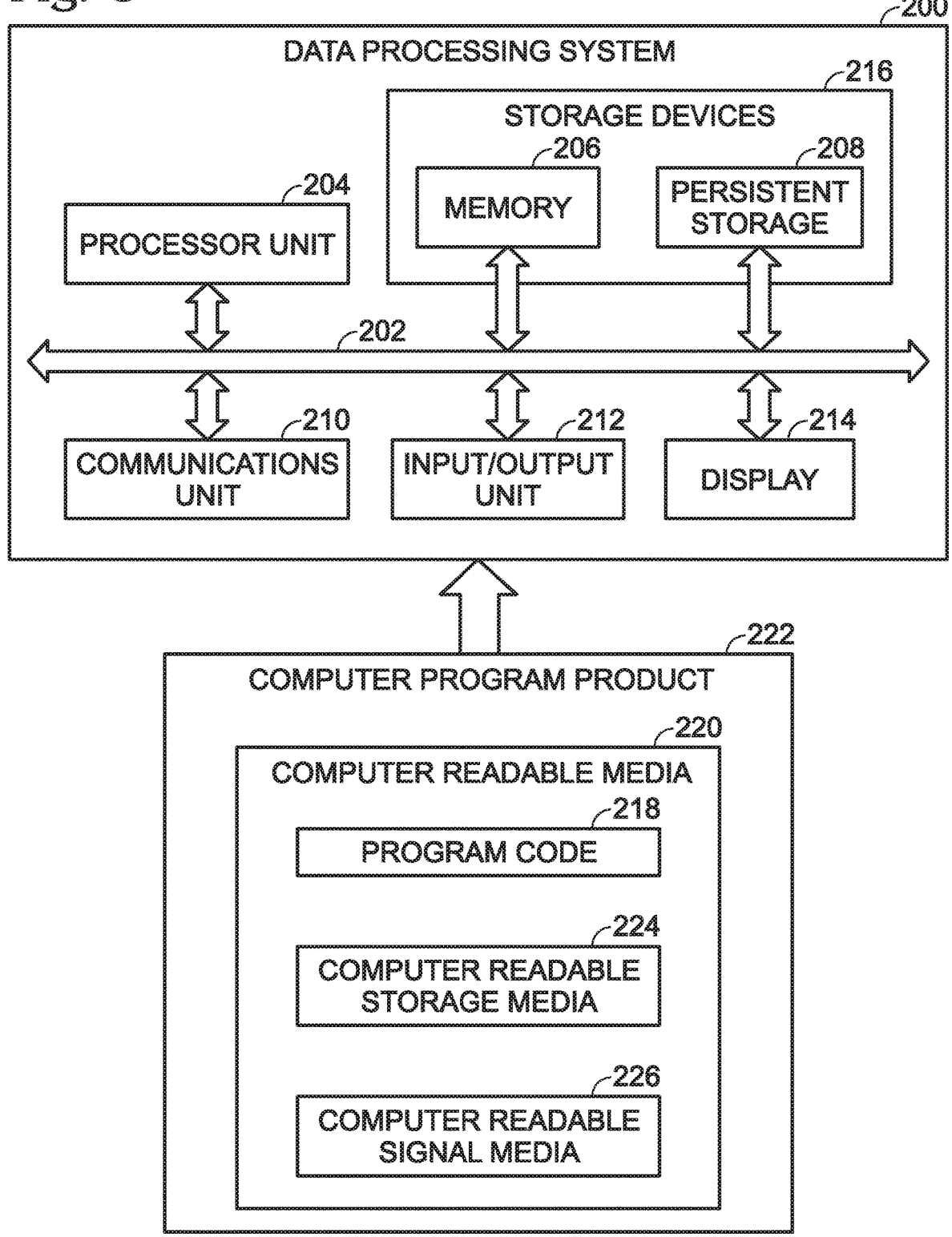
FIG. 8 is a schematic diagram of various components of an illustrative data processing system.

This example describes a data processing system 200. In this example, system 200 is an illustrative data processing system suitable for interfacing with and/or implementing one or more portions of a data storage system described above. For example, data processing system 200 may comprise a host computer, an interface bridge circuit, an authentication manager circuit, a control circuit, or other processor-based circuit; See FIG. 8. Actual implementations may have more or fewer components as appropriate for the particular application.

In this illustrative example, data processing system 200 includes communications framework 202. Communications framework 202 provides communications between processor unit 204, memory 206, persistent storage 208, communications unit 210, input/output (I/O) unit 212, and display 214. Memory 206, persistent storage 208, communications unit 210, input/output (I/O) unit 212, and display 214 are examples of resources accessible by processor unit 204 via communications framework 202.

Processor unit 204 serves to run instructions of software that may be loaded into memory 206. Processor unit 204 may be a number of processors, a multi-processor core, or some other type of processor, depending on the particular implementation. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage areas 216. A data storage area is any piece of hardware, portion of a piece of hardware, portion of a combination of pieces of hardware, a virtual partition in one or more pieces of hardware, which pieces of hardware are capable of storing information, such as, for example, without limitation, data, program code in functional form, and other suitable information either on a temporary basis or a permanent basis.

Data storage areas 216 also may be referred to as computer readable storage devices in these examples. Memory 206, in these examples, may be, for example, a random access memory or any other suitable volatile or non-volatile storage device, or a combination of such devices.

Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, a virtual or logical drive, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both wired and wireless communications links.

Input/output (I/O) unit 212 allows for input and output of data with other devices that may be connected to data processing system 200. For example, input/output (I/O) unit 212 may provide a connection for user input through a keyboard, a mouse, and/or some other suitable input device. Further, input/output (I/O) unit 212 may send output to a printer. Display 214 provides a mechanism to display information to a user.

Instructions for the operating system, applications, and/or programs may be located in data storage areas 216, which are in communication with processor unit 204 through communications framework 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program instructions, program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be non-transitory computer readable storage media 224 or transitory computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200.

In these examples, computer readable storage media 224 is a physical or tangible non-transitory storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to and/or in place of those illustrated for data processing system 200. Other components shown in FIG. 8 can be varied from the illustrative examples shown. The different embodiments may be implemented using any hardware device or system capable of running program code. As one example, data processing system 200 may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted, because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, communications unit 210 may include a number of devices that transmit data, receive data, or both transmit and receive data. Communications unit 210 may be, for example, a modem or a network adapter, two network adapters, or some combination thereof. Further, a memory may be, for example, memory 206, or a cache, such as that found in an interface and memory controller hub that may be present in communications framework 202.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 6

This example describes a network data processing system 240 in which illustrative embodiments may be implemented; see FIG. 9. It should be appreciated that FIG. 9 is provided as an illustration of one implementation and is not intended to imply any limitation with regard to environments in which different embodiments may be implemented. Many modifications to the depicted environment may be made.

Network data processing system 240 is a network of computers in which one or more illustrative embodiments of a malware resistant computer system or data storage system may be implemented. Network data processing system 240 may include network 242, which is a medium configured to provide communications links between various devices and computers connected together within network data processing system 240. Network 242 may include connections such as wired or wireless communication links, fiber optic cables, and/or any other suitable medium for transmitting and/or communicating data between network devices, or any combination thereof.

In the depicted example, a first network device 244 and a second network device 246 connect to network 242, as does an electronic storage device 248. In the depicted example, devices 244 and 246 are shown as server computers. However, network devices may include, without limitation, one or more routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices 250, 252, and 254 connect to network 252. Client electronic devices 250, 252, and 254 may include, for example, one or more personal computers, network computers, and/or mobile computing devices such as personal digital assistants (PDAs), smart phones, handheld gaming devices, wearable devices, and/or tablet computers, and the like. In the depicted example, server 244 provides information, such as boot files, operating system images, and applications to one or more of client electronic devices 250, 252, and 254. Client electronic devices 250, 252, and 254 may be referred to as "clients" with respect to a server such as server computer 244. Network data processing system 240 may include more or fewer servers and clients, as well as other devices not shown.

Program code located in system 240 may be stored in or on a computer recordable storage medium and downloaded to a data processing system or other device for use. For example, program code may be stored on a computer recordable storage medium on server computer 244 and downloaded to client 250 over network 242 for use on client 250.

Network data processing system 240 may be implemented as one or more of a number of different types of networks. For example, system 240 may include an intranet, a local area network (LAN), a wide area network (WAN), or a personal area network (PAN). In some examples, network data processing system 140 includes the Internet, with network 142 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. FIG. 9 is intended as an example, and not as an architectural limitation for any illustrative embodiments.

Example 7

This example describes illustrative networks including one or more malware-resistant data storage systems; see FIGS. 10-15.

FIG. 10 shows an illustrative computer network system 260, which is an example of a network system 240 described in Example 6. Computer network system 260 may include a first network 262 in the form of a LAN interconnecting a plurality of client computers 264, a network attached storage device (NAS) 266, a network server 268, and a firewall 270 interfacing the LAN network 262 with external networks. Each client computer 264 includes a computer network interface controller (NIC) 272, and may include a malware-resistant data storage system similar to the embodiments described above. In these examples, the malware-resistant data storage systems are network-enabled, and include a data-storage-system bridge NIC 274 located in a display board as is described further below. Each bridge NIC 274 is connected via a second bridge network 276, isolated from computer network 262, to a bridge mode controller 278 of a user-interface system 280. Mode controller 278, also referred to as a user-interface device, is controllable by one or more user-interface computers 282 on the isolated bridge LAN 276. Network system 260 may be restricted to have only one mode controller 278 allowed on network 276.

Figure 11:
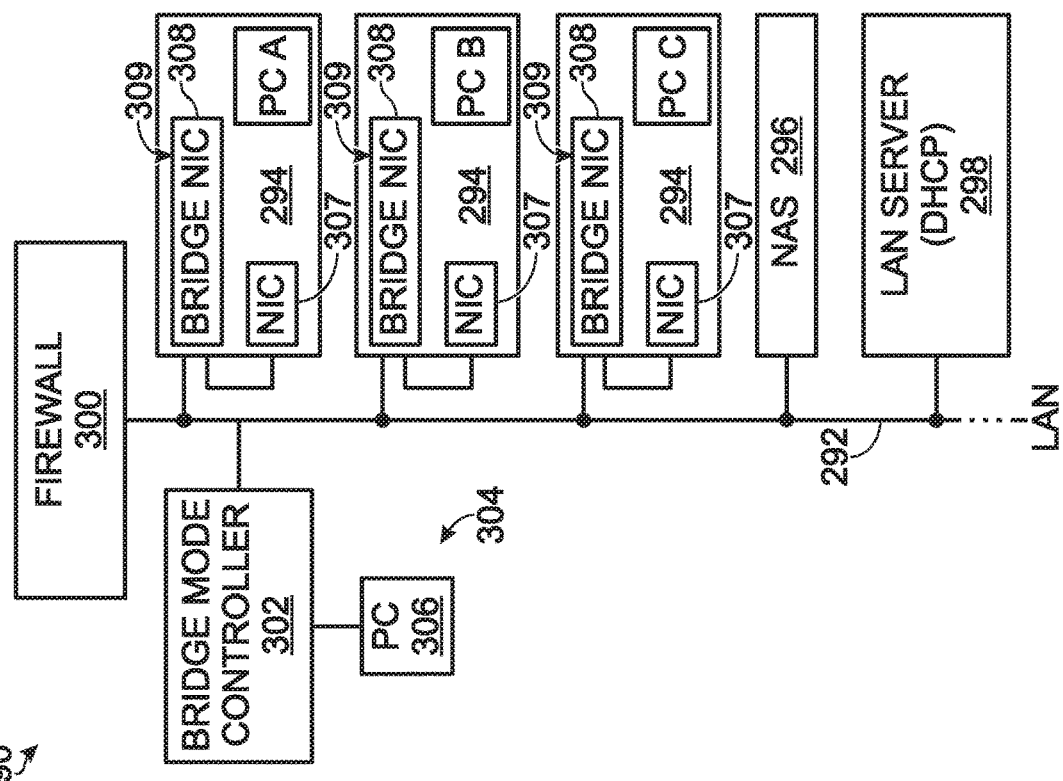
FIG. 11 is a schematic diagram of an illustrative network system including computers having malware-resistant storage systems, and a malware-resistant storage system controller sharing a network.

FIG. 11 shows a computer network system 290 similar to the one shown in FIG. 10, except that a common network 292 is a combined network on which client computers 294, a NAS 296, a server 298, a firewall 300, and a user-interface device or bridge mode controller 302 of a user-interface system 304 are all operatively connected in common. In this embodiment, the mode controller is controlled via a direct Ethernet connection to a user-interface computer 306.

In this example, each client computer 294 includes a host computer network interface controller (NIC) 307, and may include a malware-resistant data storage system similar to the embodiments described above. In these examples, the malware-resistant data storage systems are network-enabled, and include a data-storage-system bridge NIC 308 that also functions as a network switch 309. Each NIC 307 is connected to network switch 309 rather than being directly connected to network 292. Network switch 309 provides a network communication interface for both host computer NIC 307 and bridge NIC 308. Each client computer 294 thus has a single connection to common network 292.

It will be appreciated that other network and mode controller interfaces may be used. For example, mode controller 278 connected to isolated bridge LAN 276 may be controlled by user-interface computer 282 directly connected to the mode controller 278. Also, mode controller 302, connected to common LAN 292, may be controlled by an user-interface computer 306 also directly connected to the common LAN 292.

Figure 12:
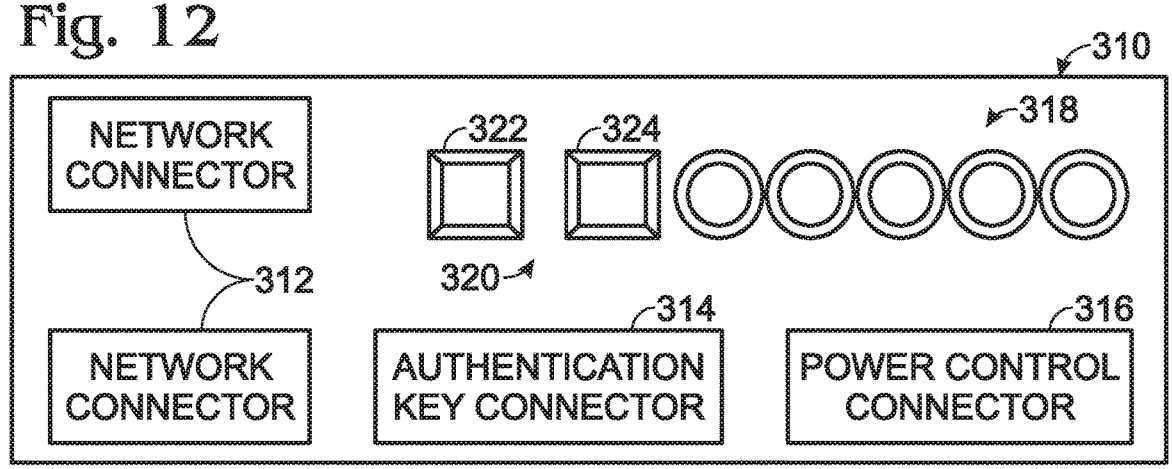
FIG. 12 is a generalized illustration of an example of an interface board directly coupled to a control circuit for use in a network system of FIG. 10 or FIG. 11.

The bridge NIC 272 or 308 is part of a network display board 310 located at each client computer 264 or 294. The network display board 310, having a front display as shown in FIG. 12, forms part of user-interface system 280 or 304. Display board 310, including an associated modified local user-interface circuit having a microprocessor, replaces display board 96 and user-interface circuit 58 of data storage system 44 described with reference to FIGS. 2-5. The local user-interface circuit receives the inputs from the network, inputs optionally from a user, power from the local host or client computer, outputs operational indicators on the display board, sends network communications to the host NIC 307, and communicates control signals received on the network to the control circuit.

Display board 310 accordingly includes two network connectors 312, an authentication key connector 314, and a power control connector 316. The network connector 312 is a communication port, such as a 10/100 Ethernet, RJ45 connector. One network connector 312 attaches the network display board 310 to the network 276 or 292 and is used by the bridge mode controller 278 to communicate with the control circuit, such as control circuit 56 of data storage system 44. This network port may be configured for client dynamic host configuration protocol (DHCP). The other network connector 312 is connected to the host NIC 307.

Authentication key connector 314 may be, for example, a mini-USB connector for receiving an authentication key 90 when local use of an authentication key is selected by a user as is described further below. An enable signal may be provided to control whether or not the local authentication key can be used. The default state is that the local authentication key function is "disabled".

Power control connector 316 may in the form of an ATX power control connector. The network display board 310 controls power to the host computer system via a standard ATX power supply connector. The network display board 310 controls pin-16 (Power On) of the ATX power supply connector. The host computer system power switch is provided to the network display board to allow the host system power switch to function properly.

System status indicators 318, such as a series of LEDs, are also provided. Indicators may be provided to indicate aspects of various system functions, such as the status of the protected system drive and the read/write or data drive, drive activity, authentication key code loading, status of the network connection, and an indication of pairing of the network display board with the bridge mode controller.

User-actuatable switches 320 may also be provided. For example, a push switch 322 may be used to initiate the pairing function for attaching this specific network display board to the network bridge mode controller. Further, a push switch 324 may be used that allows a user to switch the function of network display board 310 to that of display board 96 and user-interface circuit 58 of data storage system 44. The bridge mode controller 278 or 302 may be used to enable or disable this local-mode function.

Figure 13:
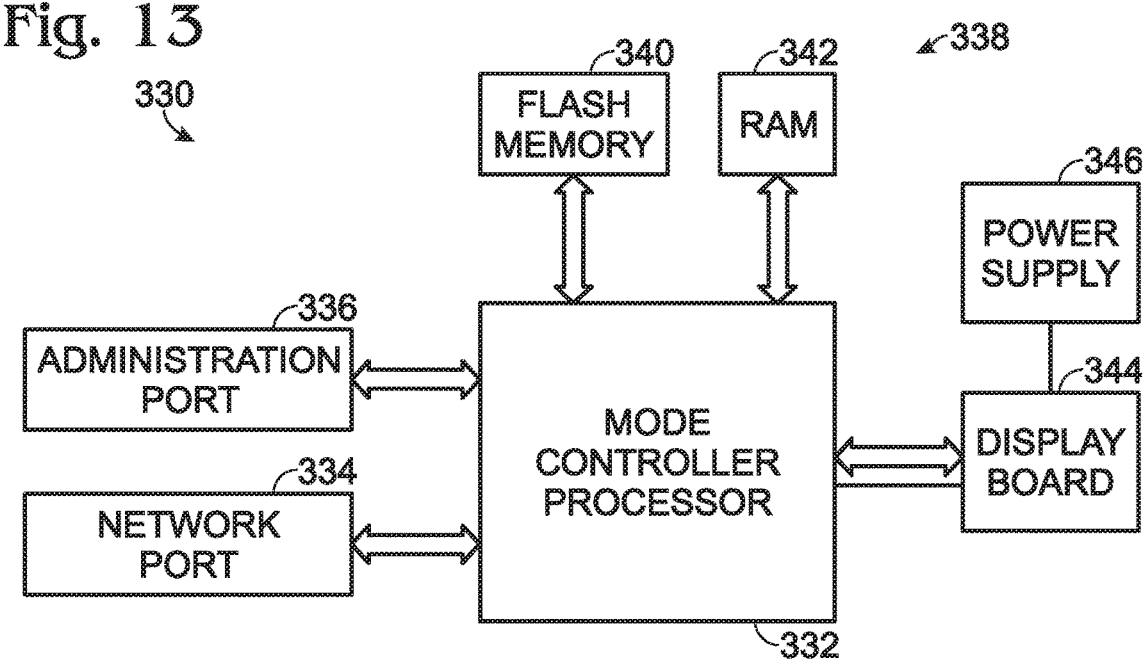
FIG. 13 is a schematic diagram of a user-interface system for use in a network system of FIG. 10 or FIG. 11.

FIG. 13 illustrates an example of a bridge mode controller circuit 330 that may be used as a bridge mode controller 278 or 302. As shown, mode controller circuit 330 may include a main mode controller processor 332, a network port 334, an administration port 336, data storage areas 338 including a persistent flash memory 340 and a random access memory (RAM) 342, a display circuit board 344, and a power supply 346.

Network port 334 may be a suitable network interface, such as an RJ45 Ethernet connector. The network port 334 may be used to attach the mode controller circuit 330 to the network 276 or 292. The mode controller circuit 330 may function as the server in providing DHCP services to all attached network display boards 310 where a dedicated separate network 276 is used. Mode controller circuit 330 also functions as a DHCP client where a combined network 292 is used, and requests an IP Address from the network 292. If the network has a static IP configuration, it receives and uses a configured IP address. The network port 334 may also be used to allow or block access to a mode controller circuit web server. In the following discussion, it is intended that reference to communication between the mode controller circuit 330 and a network display board 310 also means communication with the control circuit 158 as discussed with reference to data storage system 150.

Administration port 336 may also be an RJ45 connector, which is positioned to be easily assessable by the administrator for connection of a laptop or desktop computer. This port will be used by the administrator to gain access to the mode controller circuit web server control pages discussed further below. Using the administration port 336, the mode controller circuit 330 may function in a server mode to provide DHCP services to an attached computer 282 or 306. Mode controller circuit 330 may also function in a client mode to request an IP Address from the network it is attached to. In a static IP configuration, it uses a configured IP address.

Figure 14:
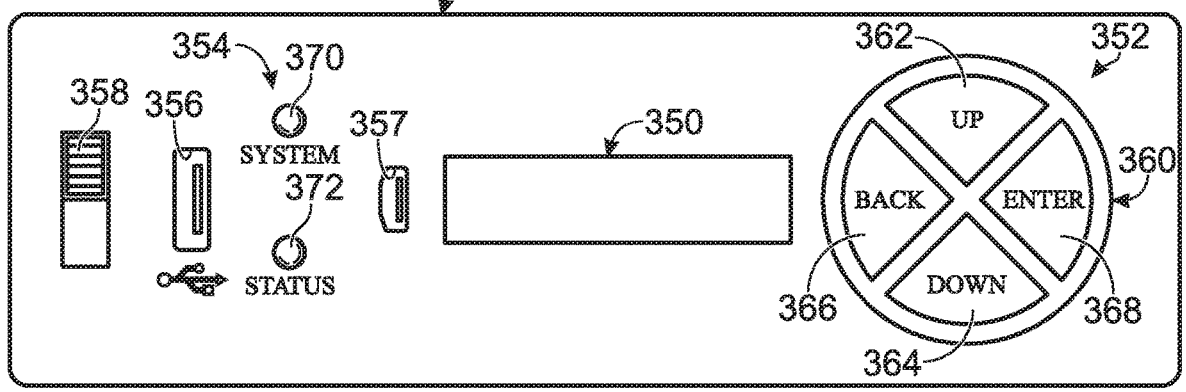
FIG. 14 is an example of a user-interface of a user-interface circuit for use in the user-interface system of FIG. 13.

An example of a display panel 348 of a display circuit board 344 is illustrated in FIG. 14. Display panel 348 may include a display 350, an input device 352 for manipulating the display and providing associated inputs to mode controller circuit 330, visual indicators 354, communication ports 356 and 357, and a user-actuatable switch 358.

Display 350 may be an LCD, LED, or other suitable display. Input device 352 may be any suitable input device, such as a cruciform switch 360 shown in FIG. 14. Cruciform switch 360 may include an "up" button 362 for advancing a cursor or position indicator upwardly on the display, a "down" button 364 for moving the cursor or position indicator downwardly on the display, a "back" button 366 for returning to a prior display content, and an "enter" button 368 for selecting a content associated with a cursor or position indicator. The display 350 and cruciform switch 360 may allow a user to display and modify an IP address and other system settings.

Communication port 356 may be any suitable receptacle such as a USB connector and may be configured to receive a connector such as a common access card (CAC) reader when two-factor authentication is used. Communication port 357 may be an authentication-key receptacle like receptacle 86 of display circuit board 96 or key connector 314 of network display board 310, such as a mini-USB connector. Communication port 356 is configured to receive an authentication key, such as authentication key 90. Authentication key codes may only be stored in either the mode controller circuit 330 or the network display board 310 until there is a mode change. In some examples, the authentication key code is only stored in the network display board 310 (i.e., the control circuit).

As discussed above, to change the mode of a control circuit 56 or group of control circuits 56 associated with each of a plurality of host computers 264 or 294 from a write-lock (or read-only) protected mode to administration (read/write) mode, a network administrator or other authorized user places the authentication key into communication port 357 if the modes of a group of data storage systems are to be changed, or authentication key connector 314 of a network display board 310 if the mode of only the associated local data storage system is to be changed. The mode controller circuit 330 then sends that authentication code to each targeted network display board 310 for communication with the associated control circuit 56. Each targeted control circuit 56 that recognizes the received authentication code as being the same as the stored code then and only then changes the operating mode to the administration (read/write) mode. Once the mode controller circuit 330 is returned to the protected mode, the authentication key is removed from communication port in the mode controller circuit 330 or the individual network display board. When the authentication code is stored on a flash memory in the mode controller circuit 330, the flash memory may be overwritten.

Visual indicators 354 may include a first LED 370 indicating the status of the power supplied to the mode controller circuit 330. A second LED 372 may indicate the status of the mode controller circuit 330. For example, LED 372 may be green when all of the control circuits 56 on the network are in the protected mode, and yellow if any control circuit 56 is the administration (read/write) mode.

Switch 358 may be a slide switch that the administrator or other user uses to control power to the mode controller circuit 330, such as for use in changing modes on the mode controller circuit as has been described above.

As mentioned, user-interface computers 282 or 306 provide an interactive display to control and monitor the status of the network display boards 310 on the respective network 276 or 292. An example of such a computer screen display 380 is illustrated in FIG. 15. An administrator is required to log into the system and provide a user name and password to gain access to mode controller circuit 330 functioning as a mode controller web server. Display 380 shows the status of all network display boards 310 attached to the mode controller circuit 330 via the network 276 or 292. The display allows the administrator to change modes of each of the attached network display boards 310.

As shown in FIG. 15, the network display boards 310 and associated data storage system are listed individually in rows 382, with features of each network display board shown by a series of columns 384. In this example, each row 382 includes the following items. In the following, the network display board is referenced as the communication portal to the associated control circuit 56 and data storage system 44.

1. An identifier of the network display board 310, such as an assigned name like "East-1" or other name as desired by the user.
2. A pull down "Group Assignment" selection menu. The default assignment may be "None." Groups may have assigned names as appropriate, such as "East" or the mode controller circuit 330 may provide predetermined names, such as a letter of the alphabet. Group assignments may be made when all of the network display boards 310 that are to be put in a common group are in the administration mode and this condition may be made a requirement for assigning a plurality of network display boards to a group. Once the group is assigned, control of all network display boards in a specific group may be provided by controlling any one network display board in that group. Device and group names may also be provided by a network grouping protocol of the network system, such as the proprietary Active Directory for Windows® Protocol.
3. A virtual "slide switch" 386 having the heading "Mode" may be used setting the mode in the specific network display board 310 or group that the specific network display board belongs to. Other visual forms may be used for selecting the mode, such as a drop-down menu associated with a variable field. The slide for mode select may allow selection between "Lock" for protected mode and "Admin" for Administration or read/write mode. Any network display board that is currently in Administration mode may be displayed in a distinctive visual manner, such as highlighting it in a representative color, such as "yellow".
4. A user-writable field for the appropriate system name, such as a name of the host system, the user name, an assigned asset tag, etc., that is associated with the network display board 310 may be provided.
5. A user-actuatable virtual button 388 may be used to reset the network display board to factory values. Actuation of the button, such as by "double-clicking" on the button may force the network display board to reset. This function may only be allowed when the network display board is in administration mode. The button may be grayed out when the network display board is not in administration mode.
6. A user-actuatable virtual button 388 may also be used to load an authentication code from an authentication key 90 is in communication port 356 of the mode controller circuit 330. The key load button may function like the key load push-button 94 on the display board 96.
7. A column may also indicate whether the network display board 310 has been paired with the mode controller circuit 330.
8. A user-actuatable virtual button 388 may also be used to remove the associated network display board 310 from the data base of the mode controller circuit 330, preferably with one verification prompt.
9. A column may indicate whether or not the local authentication key function has been enabled on the network display board 310.
10. A column may provide the currently assigned IP address of the network display board.
11. A column may provide the MAC address of the network display board.
12. A column may provide a timestamp of the last time this network display board 310 was placed in to administration mode. Additionally, the display may be modified to indicate whether the mode controller circuit 330 or the local administration port was used to change the mode.
13. A column may also provide a timestamp of the last time this network display board was placed in to protected mode by the mode controller circuit 330. A visual indication, not shown, may be used to indicate if the mode controller circuit or a power cycle at the network-display-board host caused the change in mode.

Generally, all fields on the display may be greyed out if the current user does not have permission to use the function.

The mode controller circuit 330 may further generate a log of mode control activity. The log may include a timestamp of any logins, network-display-board mode changes, and/or configuration changes made to the mode controller circuit. The log may be exported as a HTML file. The logs may be deleted based on a specific date—all entries prior to the specific date will be deleted. A log entry will be made anytime logs are deleted.

An emergency "WRITE LOCK ALL" button 390 may also be provided on display 380 separate from the matrix of rows 382 and columns 384 for the individual network display boards 310. When activated by a user an additional prompt may be proved that requests confirmation that the user is sure he or she wants to set the modes of all of the network display boards into protected mode. If selected, all network display boards on the system will be sent a message to place the network display boards into protected mode.

The mode controller circuit 330 may further be configured to provide configuration of network port 334 and the administration port 336 ports using a display on the user-interface computers 282 or 306. User configuration may also be provided. For example, the mode controller circuit 330 may allow two default users—an administrator and a user limited to functions available on the computer display 380 (the "front panel"). Other users may be added as desired. The administrator may be able to set the permissions for each user. The mode controller circuit may be configured to o allow the administrator to add users and modify permissions. Permissions may include the following:

1. Network Configuration
2. Log Maintenance and Reporting
3. Group Select Enable
4. Key Load Enable
5. Pairing and Remove Enable
6. Local Authentication Key EnableFollowing is an example of how the pairing of network display boards 310 on a network 276 or 292 to a mode controller circuit 330 may be provided. A network display board maybe required to be "paired" to a specific mode controller circuit for operation. During the pairing function, the network display board may communicate with the mode controller circuit, providing the mode controller circuit its MAC address and other configuration data. Once paired, all communication between the network display board and the mode controller circuit may be encrypted, such as by using a public/private key. The public key may be based on the MAC address of the network display board. Hence, each network display board on the network will use a different encryption encoding for communication.

To pair a network display board:
Attached the network display board to a data storage system 150 having the standard display board 162 removed.
Power the network display board on.
Connect the network display board to the network 276 or 292. At this point, the Paring LED is off and the Network connection LED has turned green.
Hold down the Pairing push button switch 322 until the Pairing LED blinks green.
On the mode controller circuit display 380, a new network display board device is shown. Click "Pairing Accepted" to complete pairing. The "Pairing Accepted" button turns green when a pairing request is received and is "greyed" out when the pairing is completed.
Once the unit has paired, the LED on the network display board is solid green.
If pairing failed, the LED is solid red. In this case the power is cycled off and on and the steps to establish pairing are repeated.

Mode control with a network system 260 or 290 is similar to mode control of a single data storage system 44. Once the network display board 310 is paired and an authentication code has been loaded in to the data storage system, the control circuit 56 is able to control the operational mode of data storage system. The mode controller circuit provides control to the data storage system via network based messages as the display board 96 and user-interface circuit 58 discussed above. For example, to change modes of a networked connected network display board/data storage system:

The administrator logs in to the mode controller circuit web page display 380.
The administrator inserts the appropriate authentication key 90 in to the mode controller circuit mini-USB port.
From the computer display 380, the administrator "slides" the mode switch from write-locked to administration mode for the specific data storage system or the "group" of data storage systems that have been selected.
The mode controller circuit then sends the authentication code, preferably as an encrypted message, to each network display board that has been selected. Each network display board then sets an internal "key present" control code to "yes".
Once the authentication code has been accepted by the network display board, the network display board power cycles the host computer system via the power control connector 316.
When the host system powers back on, the network display board reports to the mode controller circuit that status of the protected storage drive 50. If the authentication code is the correct one, the data storage system is put into administration/read-write mode. If the authentication code is not the correct one, the data storage system remains in write-locked mode. The mode controller circuit then updates the data storage system status on the computer display 380.
With the data storage system now in administration mode, the administrator pushes out the desired updates or new programs for storage on the otherwise protected storage drive 50.
Once the updates are complete, the administrator "slides" the mode switch from administration mode to write-locked mode for the specific data storage system or the "group" of data storage systems that had been selected.
The mode controller circuit then sends a message to the control circuit connected to the network display board to delete the authentication code. The control circuit then changes the "code present" indicator to "no" and power cycles the host computer system using the power control connector.
When the host system powers back on, the network display board reports to the mode controller circuit that the status of the protected drive is write-locked. The mode controller circuit then updates the status of the data storage system on the computer display 380. Any data storage system that did not return to write-locked mode is highlighted.

Example 8

This section describes additional aspects and features of a malware-resistant computer system, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the cross-references, in any suitable manner. Some of the paragraphs below expressly refer to and further limit other paragraphs, providing without limitation examples of some of the suitable combinations.

A computer storage system may protect a computer system from unauthorized access by malicious software. The system may be designed to protect a computer system against malicious software that would otherwise exploit a computer, or the data it contains, without consent.

A malware-resistant data storage system may shield an operating system and other programs from being unknowingly altered. Such a system may comprise two storage areas or devices that are designed to store files in two categories—ones that can change and ones that cannot—separating the operating system and other programs between files in those two categories. The protected storage device, for files that cannot change, is created using write-blocking technology so that once the files are loaded, they are locked in place and cannot change without user intervention. The other storage device, for files that can or need to be updated (such as logs and temporary files), can be either a second physical hard drive connected to the system or a network storage device.

A data storage system may include an enclosure that meets the 3.5" SATA drive standard into which two 2.5" SATA drives are mounted. One drive becomes the protected, read-only drive, and the other data drive is one which can be written to as required. This system can then be mounted into any standard computer chassis that supports 3.5" drives.

A data storage system may also support an authentication protocol that allows the computer to be booted into a maintenance read/write mode in which the protected drive can be written to so that system updates and new programs can be loaded. Once the maintenance is completed, the system is re-booted into the operational, protected, read-only mode.

A data storage system may protect not only the operating system, but also executable software (programs) or data files used by the computer.

A data storage system may be hardware-based, and is operating system agnostic in that it is not a file overlay or other software approach that is designed for use by a specific operating system. The data storage system may be used to protect any operating system. Files required to be updatable for the operating system or other software to function may be stored on the data, i.e., read/write, storage device.

A1. A control system for securing computer files from modification, comprising a control circuit is configured to be placed operatively between a computer-system processor and both a first internal data storage area and a non-volatile second internal data storage area physically separate from the first data storage area, to operatively couple the processor to the first and second internal data storage areas, to operate in a first mode to allow communication from the processor to the first internal data storage area of all commands received from the processor, to block communication to the second internal data storage area of commands that are configured to modify the second internal data storage area, and to allow communication to the second internal data storage area of commands received from the processor that are configured not to modify the second internal data storage area, and to operate in a second mode to allow communication from the processor to the first and second internal data storage areas of all commands received from the processor.

A2. The system of paragraph A1, further comprising a user-interface circuit operatively coupled to the control circuit and a first flash drive, the user-interface circuit including a communication port and configured to receive a digital user code stored on the first flash drive, which user code is selectively input by a user by attaching the first flash drive to the communication port, the user-interface circuit being configured to communicate the input user code to the control circuit, the control circuit, in response to receipt of the user code, operating in a predetermined one of the first mode and the second mode.

A3. The system of paragraph A2, wherein the control circuit receives operating energy from an energy source access to which is switched on and off selectively by the user, the control circuit being further configured to operate in the second mode if the first flash drive is connected to the communication port when access to the energy source is turned on from a state of being turned off.

A4. The system of paragraph A3, wherein the control circuit includes a memory and the control circuit is configured to store the user code received from the first flash drive on the memory.

A5. The system of paragraph A4, wherein the control circuit is configured to replace a previously stored user code with a replacement user code only in response to the insertion of a second flash drive containing the replacement user code in the communication port while the control circuit is operating in the second mode.

A6. The system of paragraph A2, further comprising a frame configured to support at least the second internal data storage area, the control circuit, and the user-interface circuit, the user-interface circuit including a sacrificial circuit element necessary for communicating the user code to the control circuit, the sacrificial circuit element being mounted relative to the frame in a position accessible to the user and being configured to be manually destructively removed from the frame by the user, the removal of the sacrificial circuit element preventing subsequent replacement of the user code stored by the control circuit.

A7. The system of paragraph A6, wherein the sacrificial circuit element must be actuated by the user while the first flash drive is inserted in the communication port in order to communicate the user code stored on the inserted first flash drive to the control circuit.

A8. The system of paragraph A2, wherein the control circuit is configured to operate in the second mode only if the user code received from the code-storage device during energy turn on to the control circuit matches the stored user code.

A9. The system of paragraph A2, wherein the control circuit is configured to store the user code input by the user.

A10. The system of paragraph A9, further comprising a frame configured to support at least the second internal data storage area, the control circuit, and a circuit board containing at least a portion of the user-interface circuit, the circuit board being mounted to the frame by manually non-destructively removable fasteners directly accessible from externally of the frame, the control circuit being operable in the first mode when the user code is stored and the circuit board has been removed from the frame.

A11. The system of paragraph A9, wherein the control circuit is configured to block all commands sent by the processor from being communicated to the second internal data storage area until the code is stored.

A12. The system of paragraph A2, wherein the user-interface circuit is configured to send the received user code to the control circuit over a local-area network independently of the processor, and the control circuit is configured to receive over the local-area network the user code sent by the user-interface circuit.

A13. The system of paragraph A1, further comprising a user-interface circuit operatively coupled to the control circuit, the user-interface circuit having a communication-port receptacle; and an electronic data storage device physically separate from the control circuit and the user-interface circuit, the electronic data storage device storing electronically the user code and having a storage-device receptacle configured to be manually operatively mated with the communication-port receptacle and manually separated from the communication-port receptacle; wherein the user-interface circuit is configured to receive electronically the digital user code from the data storage device when the storage-device receptacle is operatively mated with the communication-port receptacle and communicate the received digital user code to the control circuit, and the control circuit operates in the first mode when the storage-device receptacle is received in the communication-port receptacle and operates in the second mode when the storage-device receptacle is not received in the communication-port receptacle.

A14. The system of paragraph A1, wherein the control circuit is operatively independent of the processor.

B1. A method for securing computer files from modification, the method comprising routing communications between a processor of the computer system and the first and second internal data storage areas through a control circuit operatively independent of the processor; blocking communication to the second internal data storage area by the control circuit of commands received from the processor that are configured to modify the second internal data storage area when the control circuit is operating in a first mode; allowing communication to the second internal data storage area of commands received from the processor that are configured not to modify the second internal data storage area when the control circuit is operating in the first mode; allowing communication to the first internal data storage area of all commands received from the processor when the control circuit is operating in the first mode; and allowing communication to the first and second internal data storage areas of all commands received from the processor when the control circuit is operating in a second mode.

B2. The method of paragraph B1, further comprising receiving by a user-interface circuit having a communication port a digital user code input by a user from a first flash drive storing the digital user code when the first flash drive is connected to the communication port, communicating the received user code to the control circuit, and changing the operating mode of the control circuit from the first mode to the second mode upon receipt of the user code.

B3. The method of paragraph B2, further comprising receiving operating energy by the control circuit, detecting whether the first flash drive is connected to the communication port, and operating the control circuit in the second mode if the first flash drive is connected to the communication port when the control circuit first receives operating energy after a period when the control circuit does not receive operating energy.

B4. The method of paragraph B3, further comprising storing by the control circuit the user code received from the first flash drive.

B5. The method of paragraph B4, wherein operating the control circuit includes operating the control circuit in the first mode if the flash drive is not connected to the communication port when the control circuit first receives operating energy after a period when the control circuit does not receive operating energy.

B6. The method of paragraph B5, wherein operating the control circuit includes operating the control circuit in the first mode when a second flash drive is connected to the communication port when the control circuit first receives operating energy after a period when the control circuit does not receive operating energy and the user code received from the second flash drive connected to the communication port does not match the user code stored by the control circuit.

B7. The method of paragraph B6, wherein operating the control circuit includes operating the control circuit in the second mode when the first flash drive is connected to the communication port when the control circuit first receives operating energy after a period when the control circuit does not receive operating energy and the user code received from the first flash drive connected to the communication port matches the user code stored by the control circuit.

B8. The method of paragraph B7, further comprising replacing by the control circuit a previously stored user code with a replacement user code only when the second flash drive containing the replacement user code is inserted in the communication port while the control circuit is operating in the second mode.

B9. The method of paragraph B8, further comprising receiving by the control circuit an input from the user indicating that a replacement user code stored on the second flash drive inserted in the communication port while the control circuit is operating in the second mode is to be stored, and wherein replacing a previously stored user code includes replacing the previously stored user code when the control circuit receives the input from the user.

B10. The method of paragraph B2, wherein operating the control circuit in the second mode includes operating the control circuit in the second mode only if the user code received from the first flash drive matches the stored user code.

B11. The method of paragraph B2, further comprising storing by the control circuit the user code received from the first flash drive.

B12. The method of paragraph B11, further comprising blocking by the control circuit all commands sent by the processor from being communicated to the second internal data storage area until the user code is stored.

B13. The method of paragraph B2, further comprising sending by the user-interface circuit the received user code to the control circuit over a local-area network independently of the processor, and receiving over the local-area network by the control circuit the user code sent by the user-interface circuit.

B14. The method of paragraph B2, further comprising receiving electronically by a user-interface circuit having a communication-port receptacle a digital user code from a data storage device having storing electronically the user code and having a storage-device receptacle configured to be manually operatively mated with the communication-port receptacle and manually separated from the communication-port receptacle, the user-interface circuit receiving the digital user code when the storage-device receptacle is operatively mated with the communication-port receptacle; communicating by the user-interface circuit the received digital user code to the control circuit; operating by the control circuit in the first mode when the storage-device receptacle is received in the communication-port receptacle;

and operating by the control circuit in the second mode when the storage-device receptacle is not received in the communication-port receptacle.

C1. A computer system comprising at least one host computer having a host processor configured to be operatively coupled to a network system, and a data storage system, the data storage system including at least a first data storage area and a control circuit, the control circuit providing operative communication between the host processor and the first data storage area and being configured to be operatively coupled to the network system independent of the host processor, the first data storage area storing executable files of a host-processor operating system, the host-processor operating system being configured to store temporary files of the operating system on at least a second data storage area in operative communication with the host processor; and a user-interface system including a user-interface device configured to be operatively coupled to the network system for communication with the control circuit, the user-interface device being selectively operable in response to an input received from a user to place the control circuit into an operating mode in which the control circuit blocks commands sent by the host processor and configured to modify the first data storage area from being communicated to the first data storage area.

C2. The computer system of paragraph C1, wherein the user-interface system includes a user-interface computer configured to communicate with the user-interface device, the user-interface computer including an interactive display for receiving a control-circuit mode selection from the user.

C3. The computer system of paragraph C2, wherein the user-interface computer is configured to communicate directly with the user-interface device independent of the network system.

C4. The computer system of paragraph C1, wherein the user-interface device includes a communication port configured to receive a digital user code stored on a code-storage device connectable by the user to the communication port, the user code being selectively usable by the user for controlling the operating mode of the control circuit.

C5. The computer system of paragraph C1, wherein the control circuit is configured to change the operating mode when the control circuit is powered on, the user-interface system being configured to receive an input from the user requesting that the power to the control circuit be cycled off and then on, and to output on the network system a power-control signal directing the control circuit to cycle the control-circuit power off and then on, the control circuit being responsive to the power-control signal received from the user-interface system to cycle the power to the control circuit off and then on.

C6. The computer system of paragraph C1, wherein the host processor is configured to be operatively coupled to a first network and the user-interface system and control circuit are configured to be operatively coupled to a second network isolated from the first network.

C7. The computer system of paragraph C1, further comprising a plurality of the host computers, and wherein the user-interface system is configured to control the operating mode of each respective control circuit individually and to control the operating mode of a plurality of the respective control circuits concurrently.

C8. The computer system of paragraph C1, wherein the user-interface system includes an interface circuit directly connected to the control circuit independent of the network system, operatively coupled to the network system for communication with the user-interface device, and configured to receive an input directly from the user for controlling the operating mode of the control circuit, the user-interface system being configured to be responsive to a control signal directing the interface circuit to operate in a selected one of a first state in which the interface circuit is responsive to the input received directly from the user and a second state in which the interface circuit is not responsive to the input received directly from the user.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

Where "a" or "a first" element or the equivalent thereof is recited, such usage includes one or more such elements, neither requiring nor excluding two or more such elements. Further, ordinal indicators, such as first, second, or third, for identified elements are used to distinguish between the elements in the order in which they are introduced, and do not indicate a required or limited number of such elements, and do not indicate a particular position or order of such elements unless otherwise specifically indicated. Accordingly, the ordinal indicator used for a particular element may vary in different contexts.

The invention claimed is:

1. A control system for securing computer files from modification, comprising a control circuit configured to be placed operatively between a computer-system processor and both a first internal data storage area and a non-volatile second internal data storage area physically separate from the first data storage area, to operatively couple the processor to the first and second internal data storage areas, to operate in a first mode to allow communication from the processor to the first internal data storage area of all commands received from the processor, to block communication to the second internal data storage area of commands that are configured to modify the second internal data storage area, and to allow communication to the second internal data storage area of commands received from the processor that are configured not to modify the second internal data storage area, and to operate in a second mode to allow communication from the processor to the first and second internal data storage areas of all commands received from the processor.

2. The system of claim 1, further comprising a user-interface circuit operatively coupled to the control circuit and a first flash drive, the user-interface circuit including a communication port and configured to receive a digital user code stored on the first flash drive, which user code is selectively input by a user by attaching the first flash drive to the communication port, the user-interface circuit being configured to communicate the input user code to the control circuit, the control circuit, in response to receipt of the user code, operating in a predetermined one of the first mode and the second mode.

3. The system of claim 2, wherein the control circuit receives operating energy from an energy source access to which is switched on and off selectively by the user, the control circuit being further configured to operate in the second mode if the first flash drive is connected to the communication port when access to the energy source is turned on from a state of being turned off.

4. The system of claim 3, wherein the control circuit includes a memory and the control circuit is configured to store the user code received from the first flash drive on the memory.

5. The system of claim 4, wherein the control circuit is configured to replace a previously stored user code with a replacement user code only in response to the insertion of a second flash drive containing the replacement user code in the communication port while the control circuit is operating in the second mode.

6. The system of claim 2, further comprising a frame configured to support at least the second internal data storage area, the control circuit, and the user-interface circuit, the user-interface circuit including a sacrificial circuit element necessary for communicating the user code to the control circuit, the sacrificial circuit element being mounted relative to the frame in a position accessible to the user and being configured to be manually destructively removed from the frame by the user, the removal of the sacrificial circuit element preventing subsequent replacement of the user code stored by the control circuit.

7. The system of claim 6, wherein the sacrificial circuit element must be actuated by the user while the first flash drive is inserted in the communication port in order to communicate the user code stored on the inserted first flash drive to the control circuit.

8. The system of claim 2, wherein the control circuit is configured to operate in the second mode only if the user code received from the code-storage device during energy turn on to the control circuit matches the stored user code.

9. The system of claim 2, wherein the control circuit is configured to store the user code input by the user.

10. The system of claim 9, further comprising a frame configured to support at least the second internal data storage area, the control circuit, and a circuit board containing at least a portion of the user-interface circuit, the circuit board being mounted to the frame by manually non-destructively removable fasteners directly accessible from externally of the frame, the control circuit being operable in the first mode when the user code is stored and the circuit board has been removed from the frame.

11. The system of claim 9, wherein the control circuit is configured to block all commands sent by the processor from being communicated to the second internal data storage area until the code is stored.

12. The system of claim 2, wherein the user-interface circuit is configured to send the received user code to the control circuit over a local-area network independently of the processor, and the control circuit is configured to receive over the local-area network the user code sent by the user-interface circuit.

13. The system of claim 1, further comprising:
a user-interface circuit operatively coupled to the control circuit, the user-interface circuit having a communication-port receptacle; and
an electronic data storage device physically separate from the control circuit and the user-interface circuit, the electronic data storage device storing electronically the user code and having a storage-device receptacle configured to be manually operatively mated with the communication-port receptacle and manually separated from the communication-port receptacle;
wherein the user-interface circuit is configured to receive electronically the digital user code from the data storage device when the storage-device receptacle is operatively mated with the communication-port receptacle and communicate the received digital user code to the control circuit, and the control circuit operates in the first mode when the storage-device receptacle is received in the communication-port receptacle and operates in the second mode when the storage-device receptacle is not received in the communication-port receptacle.

14. The system of claim 1, wherein the control circuit is operatively independent of the processor.

15. A method for securing computer files from modification, the method comprising:
routing communications between a processor of the computer system and first and second internal data storage areas through a control circuit operatively independent of the processor;
blocking communication to the second internal data storage area by the control circuit of commands received from the processor that are configured to modify the second internal data storage area when the control circuit is operating in a first mode;
allowing communication to the second internal data storage area of commands received from the processor that are configured not to modify the second internal data storage area when the control circuit is operating in the first mode;
allowing communication to the first internal data storage area of all commands received from the processor when the control circuit is operating in the first mode; and
allowing communication to the first and second internal data storage areas of all commands received from the processor when the control circuit is operating in a second mode.

16. The method of claim 15, further comprising receiving by a user-interface circuit having a communication port a digital user code input by a user from a first flash drive storing the digital user code when the first flash drive is connected to the communication port, communicating the received user code to the control circuit, and changing the operating mode of the control circuit from the first mode to the second mode upon receipt of the user code.

17. The method of claim 16, further comprising receiving operating energy by the control circuit, detecting whether the first flash drive is connected to the communication port, and operating the control circuit in the second mode if the first flash drive is connected to the communication port when the control circuit first receives operating energy after a period when the control circuit does not receive operating energy.

18. The method of claim 17, further comprising storing by the control circuit the user code received from the first flash drive.

19. The method of claim 18, wherein operating the control circuit includes operating the control circuit in the first mode if the flash drive is not connected to the communication port when the control circuit first receives operating energy after a period when the control circuit does not receive operating energy.

20. The method of claim 19, wherein operating the control circuit includes operating the control circuit in the first mode when a second flash drive is connected to the communication port when the control circuit first receives operating energy after a period when the control circuit does not receive operating energy and the user code received from the second flash drive connected to the communication port does not match the user code stored by the control circuit.

21. The method of claim 20, wherein operating the control circuit includes operating the control circuit in the second mode when the first flash drive is connected to the communication port when the control circuit first receives operating energy after a period when the control circuit does not receive operating energy and the user code received from the first flash drive connected to the communication port matches the user code stored by the control circuit.

22. The method of claim 21, further comprising replacing by the control circuit a previously stored user code with a replacement user code only when the second flash drive containing the replacement user code is inserted in the communication port while the control circuit is operating in the second mode.

23. The method of claim 22, further comprising receiving by the control circuit an input from the user indicating that a replacement user code stored on the second flash drive inserted in the communication port while the control circuit is operating in the second mode is to be stored, and wherein replacing a previously stored user code includes replacing the previously stored user code when the control circuit receives the input from the user.

24. The method of claim 16, wherein operating the control circuit in the second mode includes operating the control circuit in the second mode only if the user code received from the first flash drive matches the stored user code.

25. The method of claim 16, further comprising storing by the control circuit the user code received from the first flash drive.

26. The method of claim 25, further comprising blocking by the control circuit all commands sent by the processor from being communicated to the second internal data storage area until the user code is stored.

27. The method of claim 16, further comprising sending by the user-interface circuit the received user code to the control circuit over a local-area network independently of the processor, and receiving over the local-area network by the control circuit the user code sent by the user-interface circuit.

28. The method of claim 16, further comprising:
receiving electronically by a user-interface circuit having a communication-port receptacle a digital user code from a data storage device having storing electronically the user code and having a storage-device receptacle configured to be manually operatively mated with the communication-port receptacle and manually separated from the communication-port receptacle, the user-interface circuit receiving the digital user code when the storage-device receptacle is operatively mated with the communication-port receptacle;
communicating by the user-interface circuit the received digital user code to the control circuit;
operating by the control circuit in the first mode when the storage-device receptacle is received in the communication-port receptacle; and
operating by the control circuit in the second mode when the storage-device receptacle is not received in the communication-port receptacle.

\* \* \* \* \*